(12) United States Patent
Kira et al.

(10) Patent No.: US 6,343,102 B1
(45) Date of Patent: Jan. 29, 2002

(54) IN-STATION CONTROL SYSTEM AND METHOD

(75) Inventors: Masaki Kira; Noriko Samejima; Yoshio Morita; Shiro Uriu, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/633,665

(22) Filed: Apr. 17, 1996

(30) Foreign Application Priority Data

May 1, 1995 (JP) ............................................. 7-107279
Jul. 18, 1995 (JP) ............................................. 7-181223

(51) Int. Cl.[7] ............................. H04B 3/00; H04L 25/00
(52) U.S. Cl. ...................................... 375/257; 713/600
(58) Field of Search ............................... 713/400, 600; 375/257, 259, 260, 354; 370/503

(56) References Cited

U.S. PATENT DOCUMENTS 5,007,050 A * 4/1991 Kasparian et al.
5,010,546 A * 4/1991 Kato
5,365,547 A * 11/1994 Marinaro
5,412,660 A * 5/1995 Chen et al.
5,634,007 A * 5/1997 Calta et al.

* cited by examiner

*Primary Examiner*—Jean Corrielus
(74) *Attorney, Agent, or Firm*—Rosenman & Colin LLP

(57) ABSTRACT

A peripheral device cable, connected to a peripheral device, integrally incorporates a subscriber link that is a physical line for transmitting subscriber information in synchronization with a highway clock and a control link that is a physical line for transmitting control data in synchronization with the highway clock. A control data converter controls interfacing between the control data transferred over the control link synchronously with the highway clock and control data that a control unit transmits/receives asynchronously with the highway clock. The subscriber link is connected to a switch.

15 Claims, 31 Drawing Sheets

| BIT ROW | D5 | D4 | D3 | D2 | D1 | D0 |
|---|---|---|---|---|---|---|
| | SPARE 5 | SPARE 4 | SPARE 3 | SPARE 2 | SPARE 1 | SPARE 0 |

FIG. 18

| ROW \ BIT | D7 | D6 | D5 | D4 | D3 | D2 | D1 | D0 | |
|---|---|---|---|---|---|---|---|---|---|
| 0 | 15MIN | | | | | | FRST | HRST | (1) |
| 1 | | CBCLP | ALLP | TEST | FRST | PRSTA | PRSTB | HRST | (2) |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | (3) |

FIG. 19

| BIT ROW | D7 | D6 | D5 | D4 | D3 | D2 | D1 | D0 | |
|---|---|---|---|---|---|---|---|---|---|
| 0 | 15MIN | ACT0 | ACT1 | | | | FRST | HRST | (1) |
| 1 | | CBCLP | ALLP | TEST | FRST | PRSTA | PRSTB | HRST | |
| 2 | | | | PWCB ID | | | | | (2) |
| 3 | FSYC | 2FSYC | 16FSYC | | | WPFLT | WDTFLT | μMFLT | |
| 4 | | | | | | | | | |
| 5 | | | | | | | | | |
| 6 | | | | | | | | | |
| 7 | | | | | | | | | |
| 8 | | | | | | | | | (3) |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |

FIG. 20

| BIT ROW | D7 | D6 | D5 | D4 | D3 | D2 | D1 | D0 |
|---|---|---|---|---|---|---|---|---|
| 0 | LPBC | PFCC | PFCP | PFSC | PFSD | FRST | HRST | HWLP |
| 1 | | | | | | | | |

FIG. 21

| BIT ROW | D7 | D6 | D5 | D4 | D3 | D2 | D1 | D0 | |
|---|---|---|---|---|---|---|---|---|---|
| 0 | LPBC | PFCC | PFCP | PFSC | PFSD | FRST | HRST | HWLP | (1) |
| 1 | PEC | CTC | PES | CTS | | | | | (2) |

FIG. 22

| MONITORING POINT | | FAULT MONITORING CONTENTS | FAULT INDICATION POINT | NOTE |
|---|---|---|---|---|
| P1 | DOWNWARD MAIN SIGNAL MONITOR 1509(#0) | #0-SYSTEM DDHW PARITY ERROR | PEP | #0-SYSTEM CONFOUNDING SECTION | MAIN SIGNAL |
| P2 | | #0-SYSTEM DCK/DFEP CUT | CTC | | |
| P3 | DOWNWARD CONTROL SIGNAL MONITOR 1510(#0) | #0-SYSTEM DSCHW STACK | PES | | CONTROL SIGNAL |
| P4 | | #0-SYSTEM DSCCK/DSCFCK CUT | CTS | | |
| P5 | DOWNWARD MAIN SIGNAL MONITOR 1509(#1) | #1-SYSTEM DDHW PARITY ERROR | PEP | #1-SYSTEM CONFOUNDING SECTION | MAIN SIGNAL |
| P6 | | #1-SYSTEM DCK/DFEP CUT | CTC | | |
| P7 | DOWNWARD CONTROL SIGNAL MONITOR 1510(#1) | #1-SYSTEM DSCHW STACK | PES | | CONTROL SIGNAL |
| P8 | | #1-SYSTEM DSCCK/DSCFCK CUT | CTS | | |
| P9 | CONTROL UNIT 1508 IN INDIVIDUAL SECTION 1502 | FCK OUT OF SYNC | FSYC | INDIVIDUAL-SECTION SCN | CONTROL SIGNAL |
| P10 | | EVEN/ODD FRAME OUT OF SYNC | 2FSYC | | |
| P11 | | MULTIFRAME OUT OF SYNC | 16FSYC | | |
| P12 | MAIN SIGNAL RECEIVER 1504 IN COMMON SECTION 1501 | UDHW PARITY ERROR | INTERNAL REGISTER | | #0-AND #1-SYSTEMS ARE INDEPENDENTLY MONITORED |
| P13 | | UCK/DFEP CUT | | | |
| P14 | CONTROL SIGNAL RECEIVER 1506 IN COMMON SECTION 1501 | USCHW STACK | INTERNAL REGISTER | | |
| P15 | | USCCK/DSCFCK CUT, DSCFCK OUT OF SYNC | | | |
| P16 | | ODD/EVEN FRAME OUT OF SYNC | | | |
| P17 | | MULTIFRAME OUT OF SYNC | | | |

FIG. 24

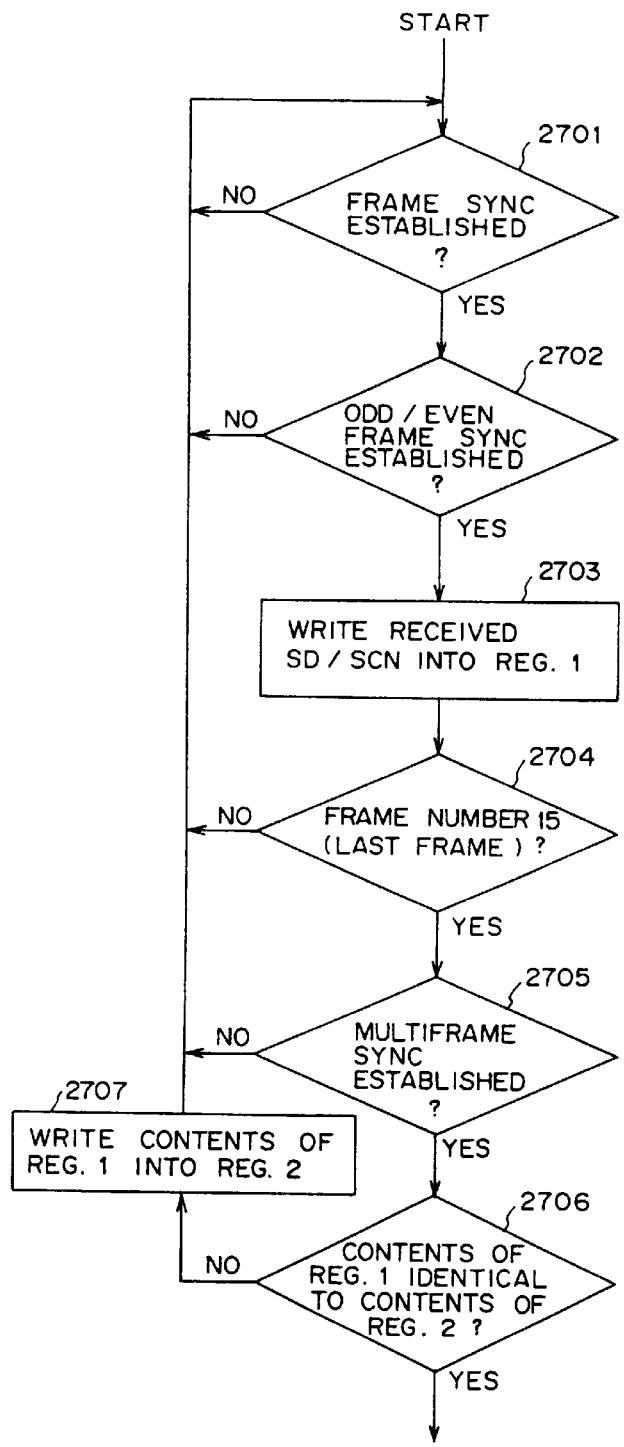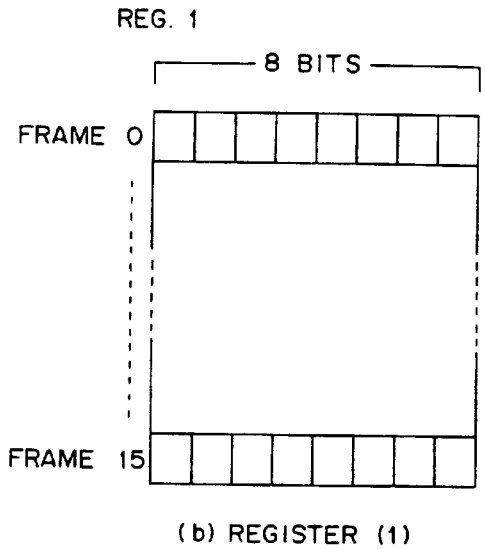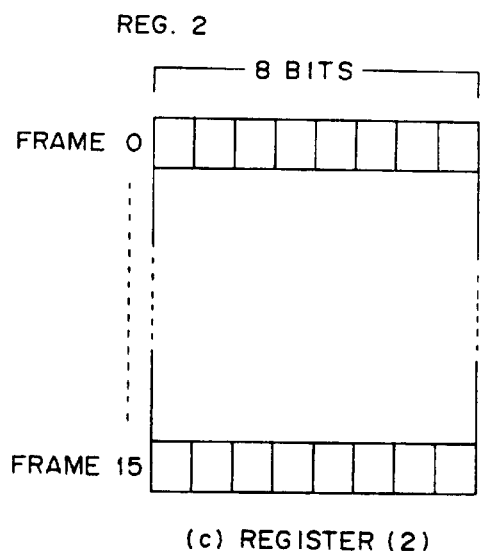
(a) PROTECTION FLOWCHART
FIG. 27

IN-STATION CONTROL SYSTEM AND METHOD

BACKGROUND OF THE INVENTION

1. Field of the Invention

The invention relates to in-device control techniques including an in-station control technique used in an exchange station, such as an ATM exchange, that controls communications of control data between a peripheral device, such as a terminal interface, that accommodates a subscriber line and a control unit that controls the entire exchange station.

2. Description of the Related Art

In an exchange, in order to control peripheral devices, such as terminal interfaces, that are attached to a channel switch and accommodate subscriber lines, it is required to communicate control data between a control unit, such as a processor, that controls the entire exchange and the terminal interfaces.

FIG. 1 is a block diagram showing a first prior art technique for such control data communications. In this prior art technique, in addition to a highway 106 that is connected between a channel switch (SW) 101 and each terminal interface (TERM) 105 and transmits subscriber data, a dedicated line (physical interface) 107 adapted to transmit control data is installed between each terminal interface 105 and a processor interface (PRIF) 104 that is connected to a central processor (CPR) 102 by a bus 103. Control signals are transferred over that dedicated line by what is called an SD (Signal Drive)/SCN (Scan) technique. In this technique, data time intervals on the dedicated line are assigned the bits of respective control signals, and internal devices communicate control signals in these data time intervals.

However, the first prior art technique has a problem that the installation of dedicated-line cables for control data becomes more complex as the configuration of an exchange system grows larger and hence it is not so easy to install more terminal interfaces 105.

On the other hand, ATM (Asynchronous Transfer Mode)-based broadband exchanges have been developed actively. In such broadband exchanges, there is a need of transmission a large amount of control information, such as subscribers' traffic information, which may occur irregularly, in addition to conventional control signals. However, when the above-described conventional technique is applied to transmission of such control signal, a problem arises in that it is difficult to map a large amount of control signal that may occur irregularly on the data time intervals on the dedicated lines.

FIG. 2 is a block diagram showing a second prior art technique for control data communications which solves the problems associated with the first prior art technique.

In this technique, a control trunk (TMCNT) 207 of the same rank as each terminal interface (TERM) 205 is connected to a channel switch (SW) 201 by a highway 206 adapted to transmit subscriber data. Control data is transmitted between each terminal interface 205 and the control trunk 207 using control cells multiplexed on the highway 206 together with subscriber's cells. The control trunk 207 is connected by a dedicated line 208 to a processor interface (PRIF) 204 that is connected to a central processor (CPR) 202 by a bus 203.

The second prior art technique allows the control trunk 207 to communicate control data with a large number of terminal interfaces 205. Therefore, control trunks are allowed to be small in number, and the frequency at which their number is increased is also low. For this reason, the installation of cables will not become so complex even if the exchange system configuration grows larger and moreover the installation of more terminal interfaces will be facilitated.

In the second prior art technique, however, not only subscriber cell communications but also control cell communications will be stopped in the event that the highway 206 that transmits subscriber cells develops a fault. In the event of such a highway fault, it becomes impossible to acquire fault information, which makes it difficult to pinpoint a faulty component and retards recovery from the fault.

SUMMARY OF THE INVENTION

The object of the invention is to provide a control data communications system which permits communications cables to be installed readily even if the configuration of an exchange system becomes large, avoids the interruption of control data communications even when a fault occurs in a highway for transmitting subscriber cells, and permits a large number of control signals which may occur irregularly to be transmitted over a dedicated line in an efficient manner.

A first mode of the invention supposes an in-station control technique for control data communications between a peripheral device in an exchange station which receives subscriber information in synchronism with a highway clock and makes subscriber information exchange and a control unit in the exchange station. The first mode comprises a peripheral device cable which is connected to a peripheral device and integrally incorporates a subscriber link that is a physical line for transmitting subscriber information in synchronism with the highway clock and a control link that is a physical line for transmitting control data in synchronism with the highway clock, and a control data converter for controlling interfacing between the control data transferred over the control link synchronously with the highway clock and control data that a control unit transmits/receives asynchronously with the highway clock.

According to the first mode of the invention, if it should be necessary for peripheral devices to be increased in number, it is only required that additional peripheral devices be connected to unused connectors mounted on an exchange cabinet by peripheral device cables.

Moreover, even in the event that the transfer of subscriber information is cut due to the occurrence of a fault in the subscriber link, if the control link develops no fault, control data can be communicated between the peripheral device and the control unit.

Furthermore, since the control data is transferred over the control link synchronously with the highway clock on the subscriber link, there is no need of providing anew a special control line and a clock controller for synchronizing the control link, permitting the system hardware scale to be reduced. In general, in an ATM exchange system and the like the frequency of the highway clock is very high, which permits high-speed control data communications with no need for an additional clock controller for the control link.

A second mode of the invention supposes an in-device control technique for controlling data transfer between first and second devices and comprises a direct memory access transfer control section, provided in each of the first and second devices, for performing direct memory access transfer processing between the first and second devices using a first data transfer time interval allocated to a signal line installed between the first and second devices and a data transfer control section, provided in each of the first and second devices, for performing data transfer processing other than the direct memory access transfer processing using a second data transfer time interval allocated to the signal line.

According to the second mode of the invention, the use of the second data transfer time interval allocated to the signal line permits a small number of specific control signals having real-time requirements for device resetting, fault notification, and the like to be communicated efficiently between the two devices as in the prior art techniques and moreover the use of the first data transfer time interval allocated to the signal line permits a large number of control signals which may occur irregularly, such as subscriber traffic information, to be transferred.

BRIEF DESCRIPTION OF THE DRAWINGS

Other objects and features of the present invention will be apparent from the following description of the preferred embodiments of the invention in conjunction with the accompanying drawings in which:

FIG. 18 is a diagram showing a data format of spare bits in the second embodiment;

FIG. 19 is a diagram showing a data format of individual SD bits in the second preferred embodiment;

FIG. 20 is a diagram showing a data format of individual SCN bits in the second preferred embodiment;

FIG. 21 is a diagram showing a data format of confounding-section SD bits in the second preferred embodiment;

FIG. 22 is a diagram showing a data format of confounding-section SCN bits in the second preferred embodiment;

FIG. 24 is a diagram showing a relation among fault monitoring points, fault monitoring contents, and fault displaying points in the second preferred embodiment;

FIG. 27 is a diagram explaining a method of protecting individual SD/SCN bits in the second preferred embodiment;

DESCRIPTION OF THE PREFERRED EMBODIMENTS

Figure 3:
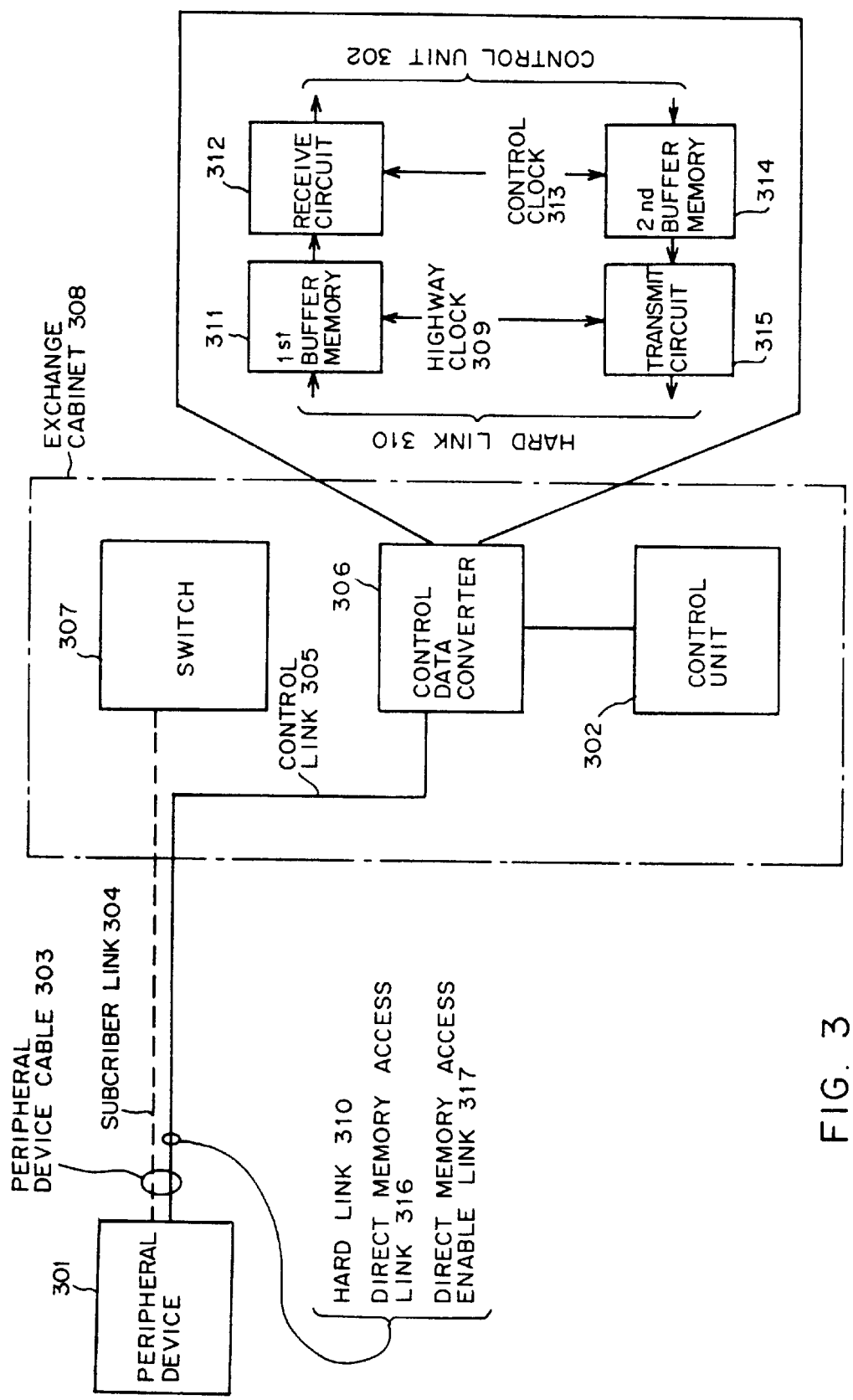
FIG. 3 is a block diagram showing a first mode of the invention.

FIG. 3 is a block diagram showing a prince of a first mode of the present invention.

The first mode of the present invention supposes an intrastation (in-station) control system which controls control data communications between peripheral equipment 301, which is located within an exchange that receives and exchanges subscriber information in synchronism with a highway clock 309, and a control unit 302 within the exchange.

In the first place, a peripheral equipment cable 303 is connected to the peripheral equipment 301 and integrally incorporates a subscriber link 304 that is a physical line for transmitting subscriber information in synchronism with the highway clock 309 and a control link 305 that is a physical line for transmitting control data in synchronism with the highway clock 309.

Next, a control data converter 306 controls interfacing between control data transferred over the control link 305 in synchronism with the highway clock 309 and control data that the control unit 302 transmits and receives asynchronously with the highway clock 309. On the other hand, the subscriber link 304 is connected to a switch 307, which exchanges subscriber information, such as ATM cells, transferred over the subscriber link 304. In this case, the control unit 302, the control data converter 306, the switch 307 and the like are integrally incorporated into an exchange cabinet 308, and the peripheral equipment cable 303 is connected to a connector mounted on the exchange cabinet.

In the above configuration, the control link 305 can be arranged to include a hard link 310 that is a physical line for transferring repeatedly a first control data group of a plurality of pieces of control data in synchronism with the highway clock 309 and at regular intervals. In this case, subscriber information is transferred over the subscriber link 304 in units of a cell each with a predetermined data length, i.e., on a cell-by-cell basis. The transfer of the first control data group may be synchronized with the transfer of the cells.

In this case, the control data converter 306 can be arranged to include a first buffer memory 311 that receives the state of the state of the first control data group from the hard link 310 in synchronism with the highway clock 309 and overwrites each piece of control data in the first control data group on its corresponding respective storage location, a receive circuit 312 which reads the storage location contents in the first buffer memory 311 in synchronism with a control clock controlled by the control unit 302 and then transfers them to the control unit 302, a second buffer memory 314 which overwrites each piece of control data in the first control data group sent from the control unit 302 on its corresponding respective storage location in synchronism with the control clock, and a transmit circuit 315 which transmits the storage location contents of the second buffer memory 314 over the hard link 310 at regular intervals and in synchronism with the highway clock 309.

In the configuration of the invention described so far, the control link 305 can be arranged to further include a direct memory access link 316 that is a physical line for transferring a second control data group of the control data in synchronism with the highway clock 309 in accordance with a direct memory access transfer procedure and a direct memory access enable link 317 that is a physical line for transferring a direct memory access enable signal specifying the effective duration of data on the direct memory access link 316 in synchronism with the highway clock 309. Further, the first control data group transferred over the hard link 310 can include a direct memory access control data group for controlling the direct memory access transfer of the second control data group over the direct memory access link 316. A first feature of the first mode of the present invention is that the exchange cabinet 308 in which the control unit 302, the control data converter 306 and the switch 307 are housed and the peripheral equipment 301 are connected, using a connector or the like, by the peripheral equipment cable 303 integrally incorporating the subscriber link 304 that is a physical line for transferring subscriber information and the control link 305 that is a physical line for transferring control data.

Where there arises a need of installing more peripheral equipment, the feature requires merely attaching new pieces of peripheral equipment to unused connectors on the exchange cabinet 308 by means of peripheral equipment cables. That is, the first feature of the first mode of the invention permits more pieces of peripheral equipment to be installed easily.

Moreover, even if a fault occurs in the subscriber link 304 and so the transfer of subscriber information is stopped, when the control link 305 develops no fault, control data communications are permitted between the peripheral equipment 301 and the control unit 302. In the event of a fault, therefore, the control unit 302 can acquire fault information from the peripheral equipment 301 to pinpoint a faulty component and make easy recovery from the fault.

Furthermore, control data on the control link 305 is transferred in synchronism with the highway clock 309 on the subscriber link 304 that is incorporated into the peripheral equipment cable 303 along with the control link 305. The highway clock 309 controls the transfer timing of subscriber information transferred over the subscriber link 304. The subscriber link 304 consist of a group of physical signal lines corresponding to eight bits by way of example. In the case of eight bits, subscriber information will be transferred in units of eight bits. The highway clock 309 determines the transfer timing of 8-bit subscriber information. Such a feature eliminates the need of providing anew a special control line or clock controller to synchronize the control link 305, permitting system hardware scale to be reduced. In an ATM exchange system or the like, the frequency of the highway clock is generally very high. Thus, high-speed control data communications are permitted without the need for an additional clock controller or the like for the control link 305.

A second feature of the first mode of the present invention is that the control link 305 includes the hard link 310 that is a physical line for transferring the state of the first control data group in synchronism with the highway clock 309 and at regular intervals. When subscriber information is transferred over the subscriber link 304 in units of a cell having a predetermined data length, or a cell-by-cell basis, the transfer of the first control data group may be synchronized with the transfer of cells.

Such a feature permits information that has a high level of redundancy but requires a high level of stability and the first control data group that needs broadcasting to be transferred using the hard link 310. In addition, synchronizing the transfer of the first control data group with the cell transfer saves the need of providing anew a special controller for controlling the transfer timing of the first control data group on the hard link 310, which further reduces the system hardware scale.

It is required that the first control data group be transferred over the hard link 310 with stability. In order to ensure the stability, some control means will be required. As a third feature of the first mode of the present invention, the state of control data of the first control data group entered in synchronism with the highway clock 309 and at regular intervals is overwritten into a corresponding respective storage location in the buffer memory at regular intervals. Even if, therefore, the first control data group is entered disturbed once or twice in succession, the contents of the first buffer memory 311 are overwritten immediately with the first control data group entered stabilized after the disturbance, and the receive circuit 312 that operates on the control clock 313 can take each piece of stable control data of the first stable control data group out of the first buffer memory 311. Thus, in the first mode of the present invention, simple receiving equipment, comprised of the first buffer memory 311 and the receive circuit 312, ensures that the first control data group is received from the hard link 310 with stability.

Likewise, the sending equipment, which is comprised of the second buffer memory 314 and the transmit circuit 315, ensures that the first control data group is transmitted over the hard link 310 with stability.

A fourth feature of the first mode of the present invention is that, in addition to the hard link 310, the control link 305 includes the direct memory access link 316 and the direct memory access enable link 317 for DMA-transferring the second control data group in synchronism with the highway clock 309, and the first control data group transferred over the hard link 310 contains the direct memory access control data group for controlling the DMA transfer operation. This allows a large amount of control data, such as traffic information and the like, to be transferred.

Figure 4:
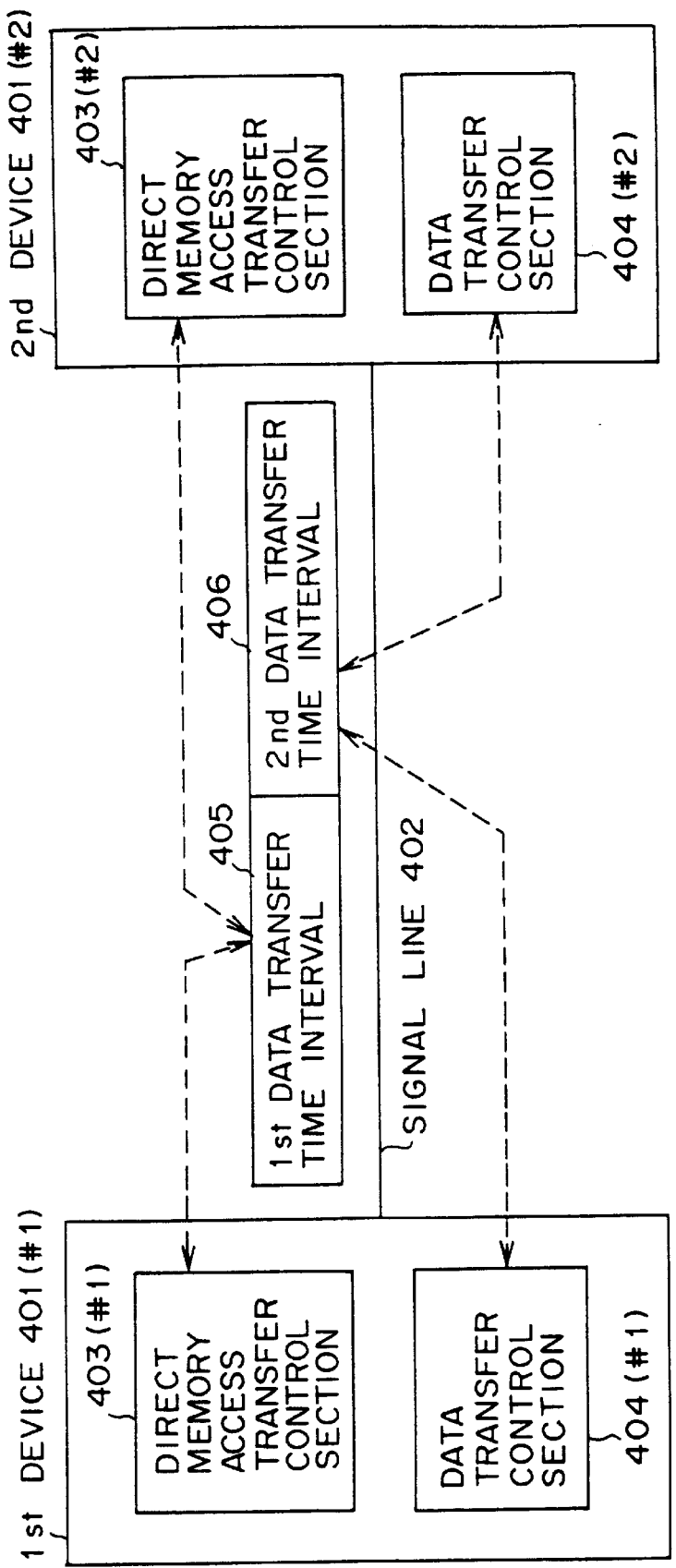
FIG. 4 is a block diagram showing a second mode of the invention.

FIG. 4 is a block diagram illustrating the principles of a second mode of the present invention.

The second mode of the present invention is distinct from the first mode of the present invention shown in FIG. 3 in that a signal line 402 in FIG. 4 which corresponds to a pair of physical lines shown in FIG. 3—the subscriber link 304 and the control link 305—consists of one physical line.

In FIG. 4, first and second pieces of equipment 401 (#1 and #2) (subscriber interface common section 201 and subscriber interface individual section 202) respectively include direct memory access transfer control sections 403 (#1 and #2) (a transmitting DMAC 2901 or 2904 and a receiving DMAC 2902 or 2903), which use a first data transfer time interval 405 (a DMA control bit group and a DMA data bit group) allocated to the signal line 402 between the first and the second equipment 401 to carry out direct memory access transfer processing between the first and the second equipment.

The first and the second equipment 401 further include data transfer control sections 404(#1) and 404(#2) (control signal transmitter/receiver sections 205, 206, and a control section 208), respectively, which use a second data transfer time interval 406 (individual SD/SCN, confounding-section SD/SCN and the like) other than the first data transfer time interval 405 allocated to the signal line 402 to carry out data transfer processing other than the above-described direct memory access transfer processing between the first and the second equipment.

In the second mode of the present invention, the signal line 402 can comprise a first signal line (downward subscriber control highway DSCHW) in the direction from the first equipment 401(#1) to the second equipment 401(#2) and a second signal line (upward subscriber control highway USCHW) in the direction from the second equipment 401 (#2) to the first equipment 401(#1).

In this case, the direct memory access transfer control sections 403 controls the direct memory access transfer processing and other data transfer processing that use the first signal line in synchronization with first clocks (a downward subscriber control clock DSCCK and a downward subscriber control frame clock DSCFCK) for the first signal line. The data transfer control sections 404 controls the direct memory access transfer processing and other data transfer processing that use the second signal line in synchronization with second clocks (an upward subscriber control clock USCCK and an upward subscriber control frame clock USCFCK) for the second signal line.

In addition, the second data transfer time interval may be split into a plurality of subintervals (individual SD/SCN and confounding-section SD/SCN).

In this case, the data transfer control sections 404 control independent data transfer processes other than the direct memory access transfer processing in the respective data transfer subintervals.

Further, in this case, the data transfer control section 404 may be configured to carry out an independent data protection process for each of the independently controlled data transfer processes in the respective data transfer subintervals.

In the second mode of the present invention, by using the second data transfer time interval 406 allocated to the signal line 402, the data transfer control sections 404 can communicate a small number of specific control signals that have real-time requirements for device resetting, fault notification and the like between the first and the second equipment 401(#1) and 401(#2) in an efficient manner, as in the prior art.

At the same time, the direct memory access transfer control sections 403 can transfer a large amount of control information which may occur irregularly, such as subscriber traffic information, in the first data transfer time interval 405 allocated to the signal line 402.

When the signal line 402 comprises first and second signal lines in the opposite directions, the direct memory access transfer processing and other data transfer processing using the first signal line and the direct memory access transfer processing and other data transfer processing using the second signal line are respectively controlled in synchronism with the first and second clocks which are independent of each other. This permits control signal communications in one direction asynchronously with communications in the other direction and hence timing management becomes easy. The second data transfer time interval is split into a plurality of subintervals and each of the subintervals is used to control an independent data transfer process, which permits the communications of a control signal comprised of a plurality of parts each corresponding to a respective one of sections in the first and the second equipment 401 (#1 and #2).

In this case, an independent data protection process is performed on each data transfer process, which permits suitable control for each communications signal.

Hereinafter, first and second preferred embodiments of the present invention which respectively correspond to the first and second modes of the present invention as described above will sequentially be described in detail.

Description of the First Preferred Embodiment

First, description will be given of a first preferred embodiment of the invention which is related to the first mode of the present invention shown in FIG. 3.

Figure 5:
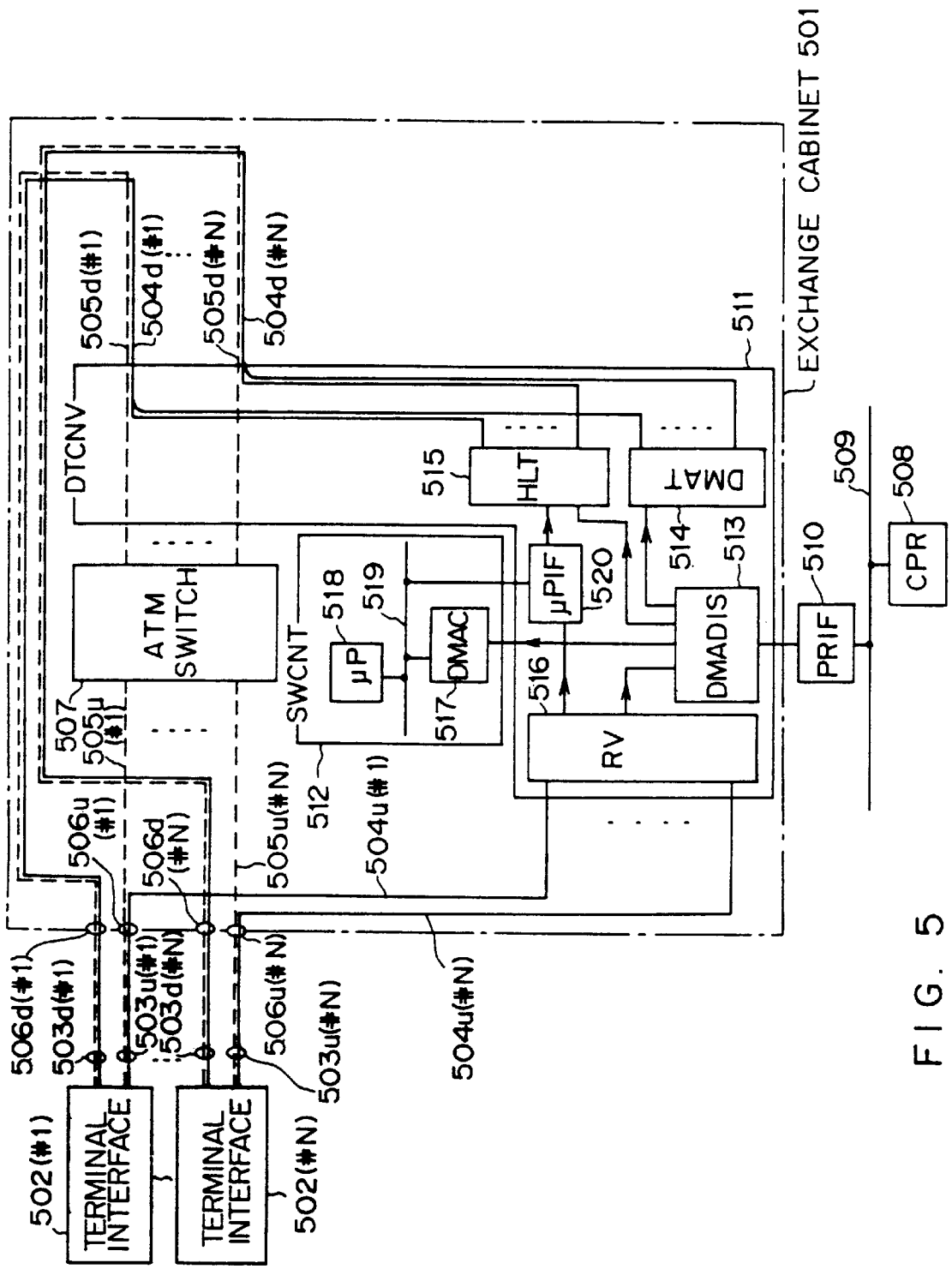
FIG. 5 is a block diagram showing the entire configuration of a first preferred embodiment of the present invention.

FIG. 5 is a diagram showing the entire configuration of the first preferred embodiment of the present invention.

Figure 1:
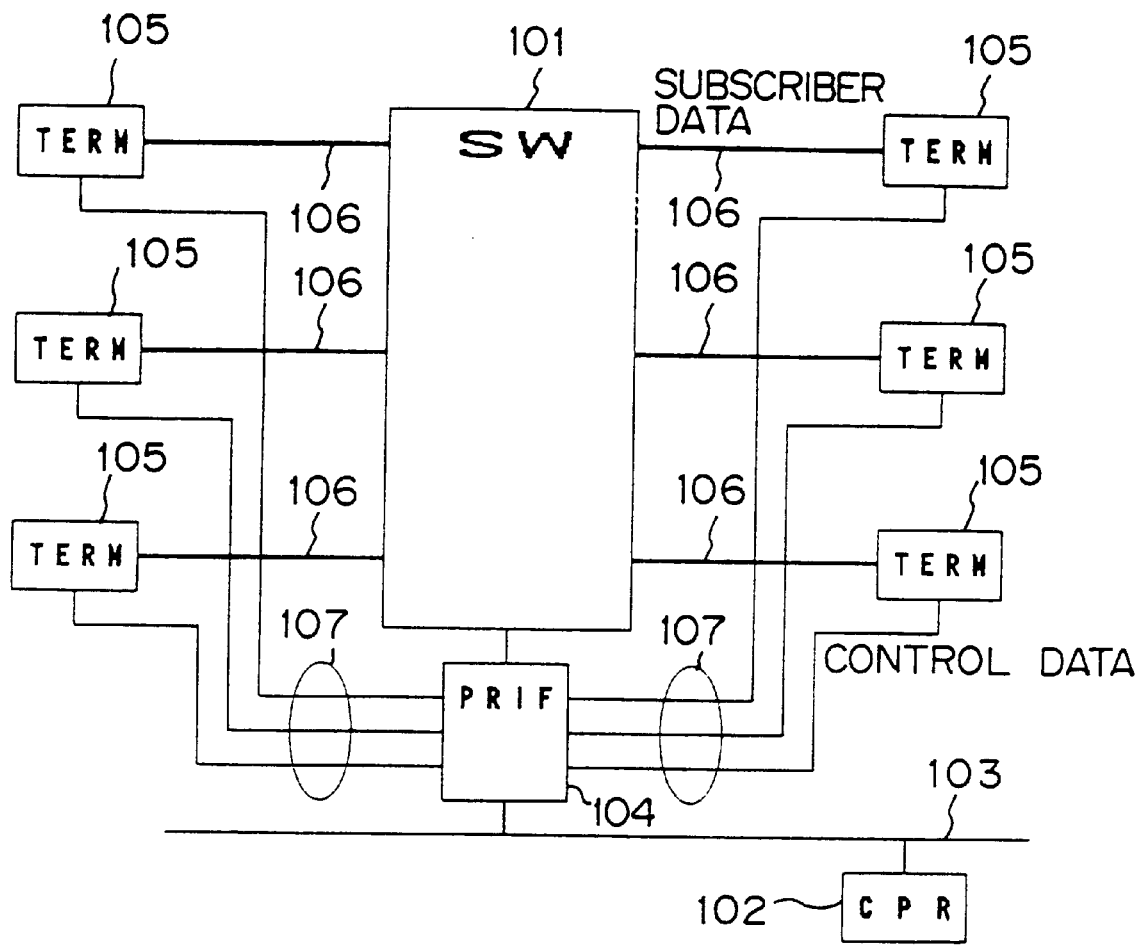
FIG. 1 is a block diagram showing a first prior art technique in which a control unit controls physical interfaces.
Figure 2:
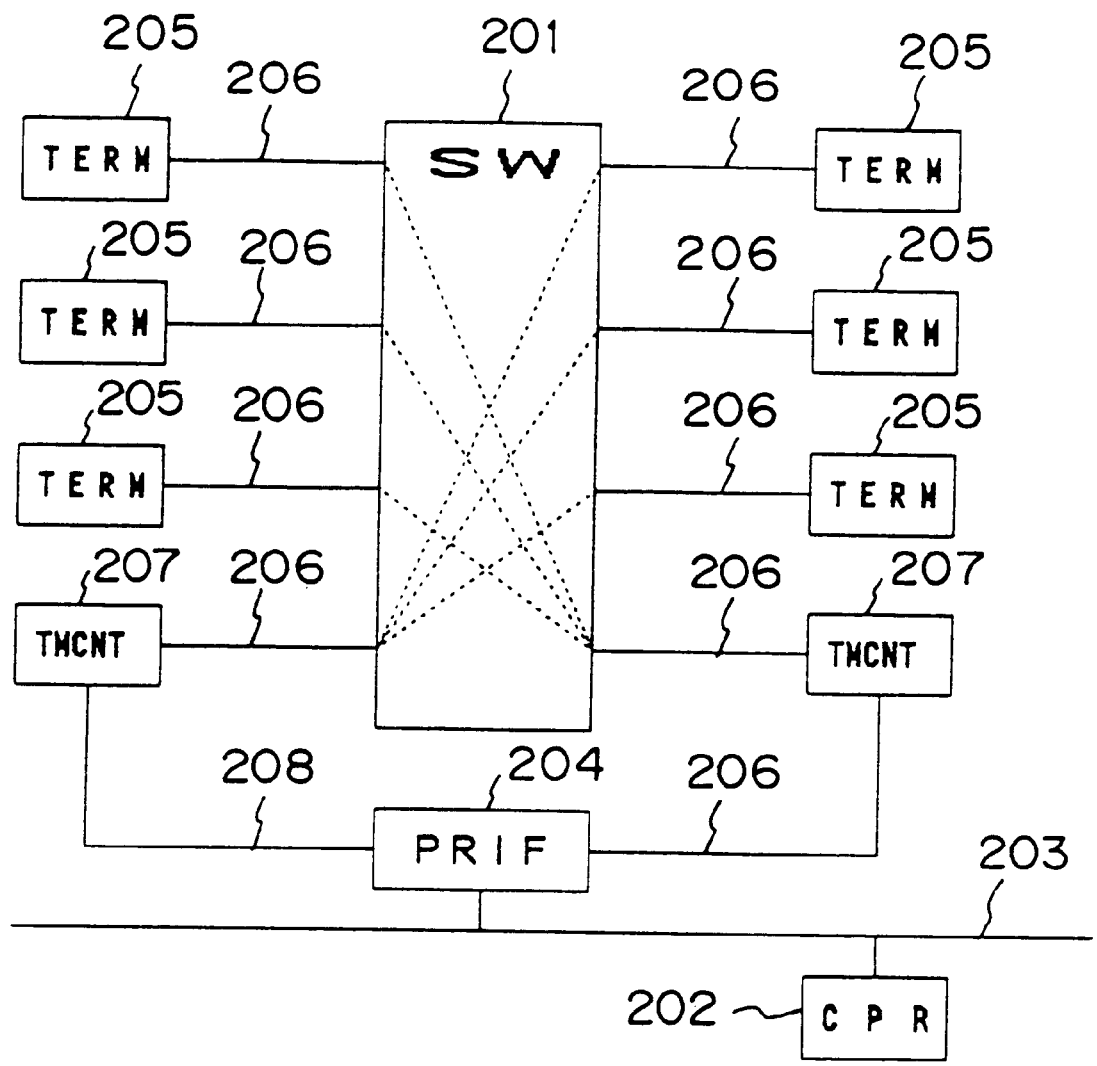
FIG. 2 is a block diagram showing a second prior art technique in which control trunks are used which are subordinate to SW highways.

A first point by which the configuration of FIG. 5 is distinct from the prior art configuration of FIGS. 1 or 2 is that an exchange cabinet 501 containing an ATM switch 507 and each terminal interfaces 502 (#1 to #N) are interconnected, through a connector 506, by a terminal interface cable 503 which integrally incorporates a subscriber link 505 (shown by a broken line) that is a physical line for transmitting subscriber data cells and a control link 504 (shown by a solid line) that is a physical line for transmitting control data. Note that the subscripts "u" and "d" in the figure indicate that their associated components are respectively used for transmission in the "upward" direction from the terminal interface 502 to the ATM switch 507 and in the "downward" direction from the ATN switch to the terminal interface. Also, symbols "#1" to "#N" indicate that their associated components are respectively related to the 1st to N-th terminal interfaces 502.

Where there arises a need of installing more terminal interfaces 502, such a feature as described above requires that new terminal interfaces 502 be merely attached to unused connectors on the exchange cabinet 501 by terminal interface cables 503. Thus, the first feature of the present invention permits new terminal interfaces 502 to be installed easily.

Even if the transfer of subscriber cells is stopped due to the occurrence of a fault in the subscriber link 505, when the control link 504 is not faulty, control data can be communicated between the terminal interface 502 and a CPR 508. Even in the event of a fault in the subscriber link, therefore, the CPR 508 can acquire fault information from the terminal interface 502, thereby locating a faulty component and making a recovery from the fault are executed easily.

In the configuration of FIG. 5, the subscriber link 505 contained in the terminal interface cable 503 is attached to the ATM switch 507 within the exchange cabinet 501. The ATM switch 507 performs a well-known exchanging operation on cells transferred over the subscriber link 505 under the control of a switch controller (SWCNT) 512 that operates under the instructions of the CPR (central processor) 508.

In the configuration of FIG. 5, on the other hand, the control link 504 contained in the terminal interface cable 503 is attached to a control data converter (DTCNV) 511, which controls control data communications between the CPR 508 and the terminal interface 502.

Here, a second feature of the present invention is that the control link 504 is composed of a hard link, a DMA link, and a DMA enable link. Although, in the first embodiment of the invention, each of these links comprises a physical line for one bit, the hard link and the DMA link each may comprise a plurality of physical lines for multiple bits. The hard link is a link used to transfer control data by means of so-called refreshing. The refreshing is a method to transfer the states of specific types of control data at regular intervals. In contrast, the DMA link is a link for transferring control data by the DMA transfer method. The DMA enable link is a link for controlling the transfer of the DMA link. Such a characteristic configuration permits information that has a high level of redundancy but requires a high level of stability and information that needs broadcasting to be transferred over the hard link and a large amount of control data, such as traffic information, to be transferred over the DMA link.

Figure 6:
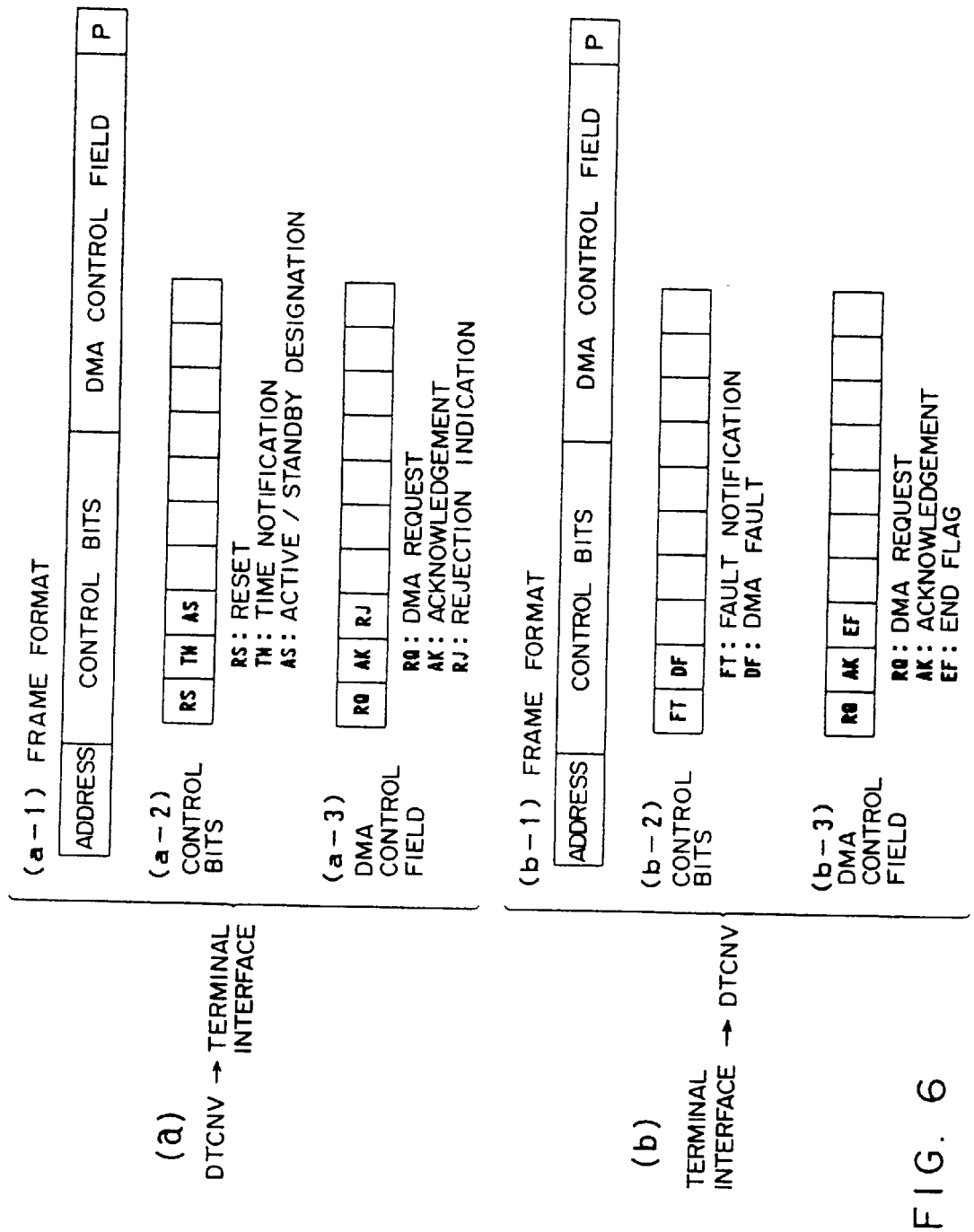
FIG. 6 is a diagram showing data formats on a hard link in the first preferred embodiment.

FIG. 6 is a diagram showing the data formats on the hard link between the terminal interface 502 and the DSCNV 511. As shown at (a-1) and (b-1) in FIG. 6, each of the data formats on the downward and upward hard links has a format of frame data that is transmitted periodically. Here, the downward hard link is included in the downward control link 504*d* that is directed from the DTCNV 511 (HLT 515) to the terminal interface 502, and the upward hard link is included in the upward control link 504*u* directed from the terminal interface to the DMAC 517 (RV 516).

As shown in FIG. 6 (a-1) and FIG. 6 (b-1), the frame data on the upward and downward hard links comprises an address part, control bits, a DMA control field, and a parity bit P for detecting and correcting a data error in the frame data.

In the frame data structure, the address part is used to specify a terminal interface 502. That is, the address in frame data shown at (a-1) in FIG. 6 on the downward hard link directed from the DTCNV 511 to a terminal interface 502 is used in order for that terminal interface to receive only frame data bound for it. On the other hand, the address in frame data shown at (b-1) in FIG. 6 on the upward hard link directed from a terminal interface 502 to the DTCNV 511 is used in order to allow the DTCNV 511 and the CPR 508 to know which terminal interface that frame data came from.

In the frame data structure, the control bits contained in the frame data shown at (a-1) in FIG. 6 on the downward hard link directed from the DTCNV 511 to a terminal interface include three items of control data for resetting RS, time notification TM, and active/standby designation AS as shown at (a-2) in the case of the first embodiment. The control data for resetting RS is used for the CPR 508 to reset a terminal interface 502. The control data for time notification TM is used for the CPR 508 to specify to a terminal interface 502 the timing of traffic data acquisition. The control data of active/standby designation AS is used to specify to a terminal interface 502, which is a duplex system, whether it is to act as an active system or a standby system. On the other hand, the control bits contained in the frame data shown at (b-1) in FIG. 6 on the upward hard link directed from a terminal interface 502 to the DTCNV 511 include two items of control data for fault notification FT and DMA fault DF as shown at (b-2) in FIG. 6 in the case of the first preferred embodiment. The control data of fault notification FT is used for a terminal interface to notify the CPR 508 of the occurrence of a fault in it. The control data of DMA fault DF is used for a terminal interface 502 to notify the CPR 508 that it has detected a fault at the time of DMA transfer.

By periodically transferring such control data in the form of control bits in frame data on the hard link, information requiring a high level of stability and information requiring broadcasting can be transferred surely.

Next, the DMA control field in the above-described frame data structure is used to communicate control data for controlling DMA-link-based DMA transfer between a terminal interface 502 and the DTCNV 511 or the CPR 508. In the first preferred embodiment, the DMA control field in frame data on both the downward and upward hard links contains DAM request RQ and acknowledgment AK as shown at (b-3) in FIG. 6. The DMA request RQ is control data used for the DTCNV 511 to make a request to the CPR 508 or a terminal interface 502 for DMA transfer as requested by that terminal interface 502 or the CPR 508. The acknowledgment AK is control data to return various acknowledgments to a requesting device at the start of DMA transfer or during DMA transfer. In the first preferred embodiment, the DMA control field in frame data shown at (a-1) in FIG. 6 on the downward hard link directed from the DTCNV 511 to a terminal interface 502 further includes rejection indication RJ as shown at (a-3) in FIG. 6. The rejection indication RJ is control data which, when a request is made by a terminal interface 502 on the DTCNV 511 for DMA transfer, is used to notify that terminal interface that it cannot accept the request for DMA transfer because it is not in the DMA transfer enable state (idle state). In the first preferred embodiment, the DMA control field in frame data shown at (b-1) in FIG. 6 on the upward hard link directed from a terminal interface 502 to the DTCNV 511 further includes an end flag EF as shown at (b-3) in FIG. 6. The end flag EF is control data used for a terminal interface to notify the DTCNV 511 of the end of DMA transfer.

By such control data being transferred in the DMA control field of frame data over a hard link, the need of providing a special control line for DMA transfer is eliminated.

Figure 7:
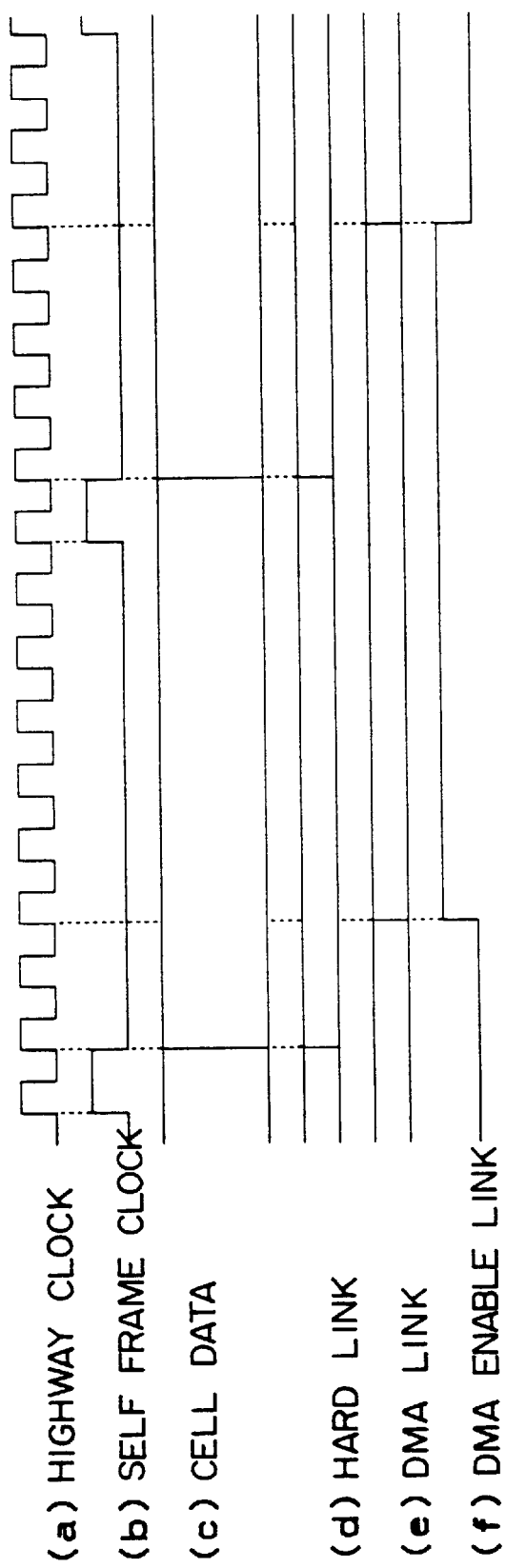
FIG. 7 is a diagram showing a data format used on a control link in the first preferred embodiment.

Next, a third feature of the present invention is that the hard link, the DMA link and the DMA enable link included in the control link 504 are transferred in synchronism with the highway clock on the subscriber link 505 incorporated in the terminal interface cable 503 together with at least the control link 504 as shown at (a), (d), (e), and (f) in FIG. 7. The highway clock controls the transfer timing of highway data forming cells transferred over the subscriber link 505. The subscriber link 505 is a group of physical lines for, say, eight bits. In this case, the highway data is transferred in units of eight bits. The highway clock determines the transfer timing of 8-bit highway data.

Such a feature eliminates the need of providing a special control line and a clock control unit for synchronizing the control link 504, thus permitting the system hardware scale to be reduced. Since the frequency of the highway clock is generally very high, high-speed control data communications are permitted with no need of providing additional clock control means or the like for the control link 504.

Further, the frame data, shown at (a) or (b) in FIG. 6, on the hard link included in the control link 504 is transferred, as shown at (b) and (d) in FIG. 7, in synchronism with a cell frame clock on the subscriber link 505 which is incorporated in the terminal interface cable 503 along with the control link 504. The cell frame clock occurs at boundaries of cell data transferred over the subscriber link 505 as shown at (b) and (c) in FIG. 7, thereby controlling synchronization on a cell-by-cell basis. Thus, the boundaries of frame data on the hard link shown at (a) or (b) in FIG. 6 will synchronize with the boundaries of cells on the subscriber link 505.

Such a feature eliminates the need of providing special control means for synchronizing frame data on the hard link, permitting the system hardware scale to be reduced. If there is room in the hardware scale, the frame data may be transferred at any times without being synchronized with the cell frame clock as long as it is synchronized with the cell clock. In this case, a specific sequence of bits is placed at the beginning and end of frame data shown at (a) or (b) in FIG. 6 to delimit it.

<detailed explanation>

Next, the control data communications facility using the above-described control link 504 will be described below.

Figure 8:
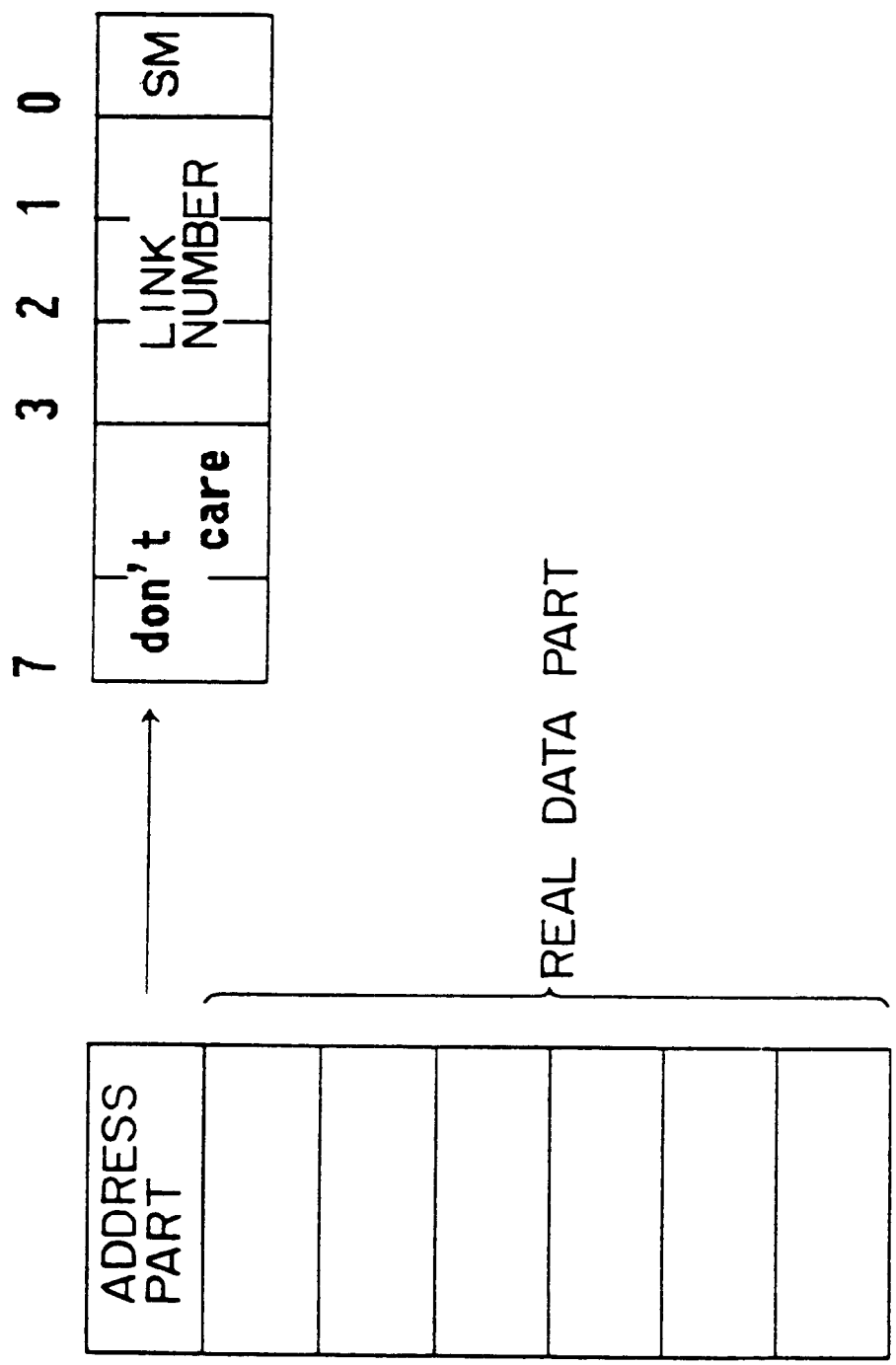
FIG. 8 is a diagram showing a data format used between the CPR and the DMADIS in the first preferred embodiment.

First, FIG. 8 shows the format of packet data transferred from the CPR 508 to a DMA distributor (DMADIS) 513 within the DTCNV 511.

Figure 9:
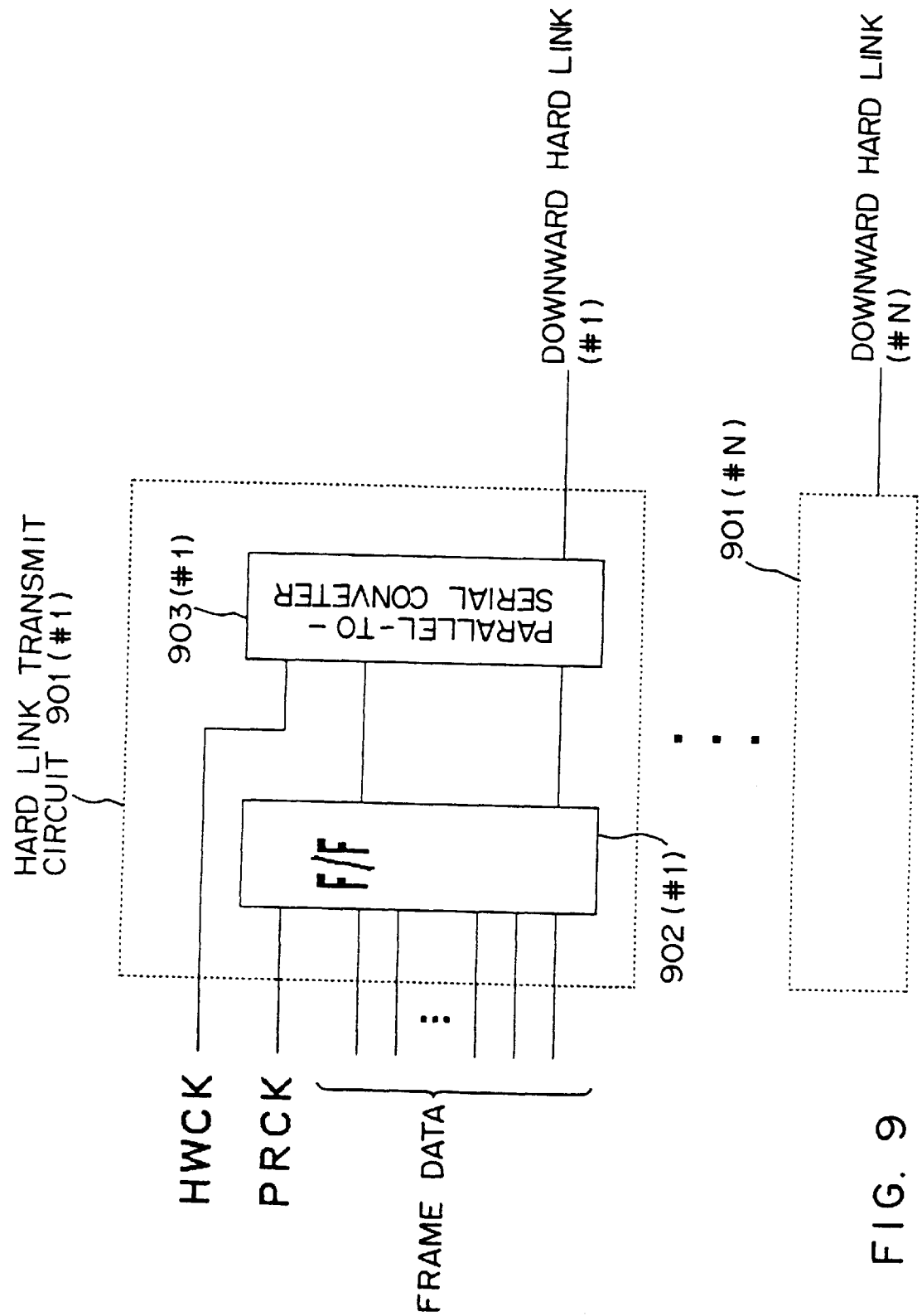
FIG. 9 is a block diagram showing a circuit configuration of the main part of the HLT in the first preferred embodiment.
Figure 10:
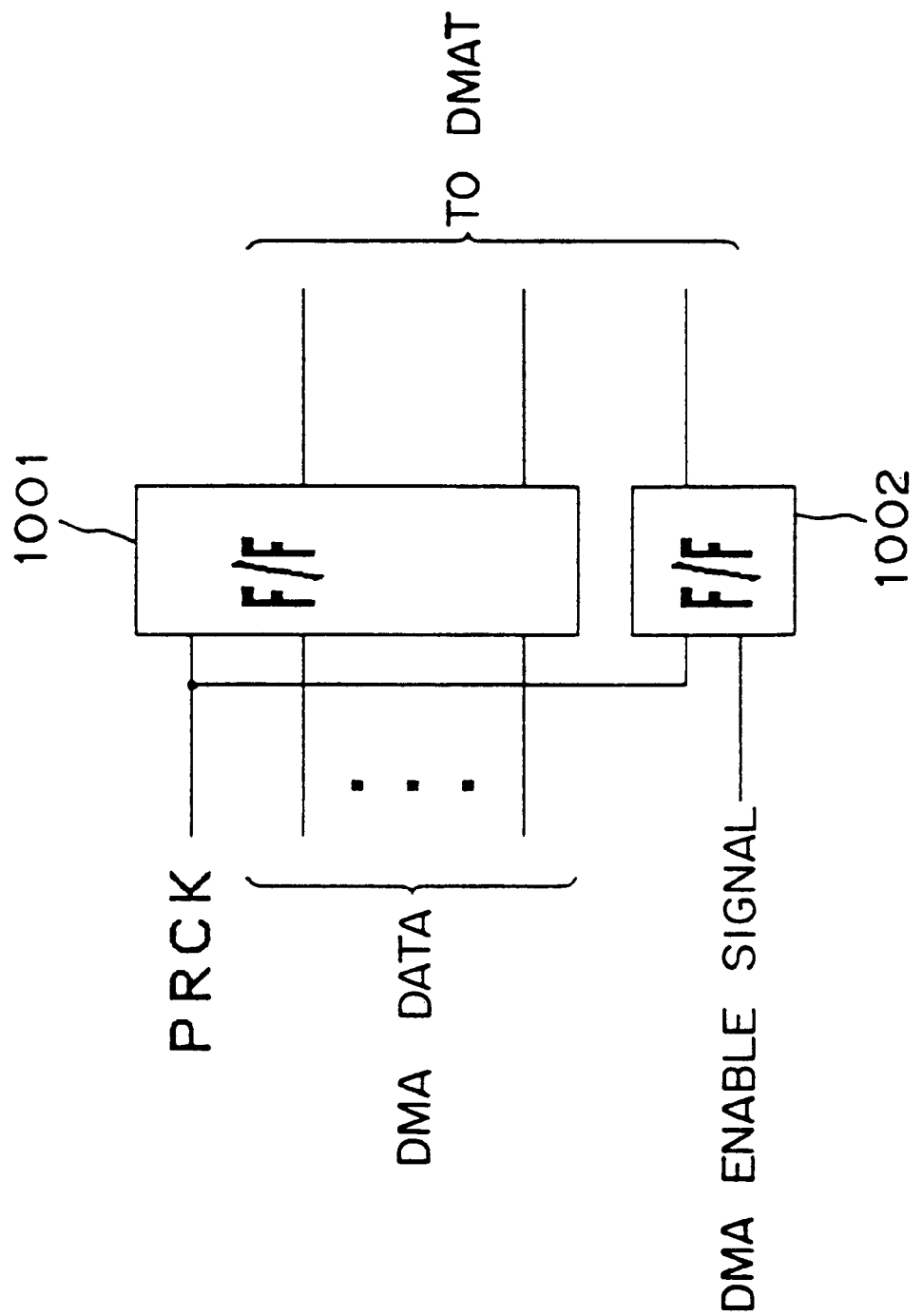
FIG. 10 is a block diagram showing a circuit configuration of the main part of the RV in the first preferred embodiment.
Figure 11:
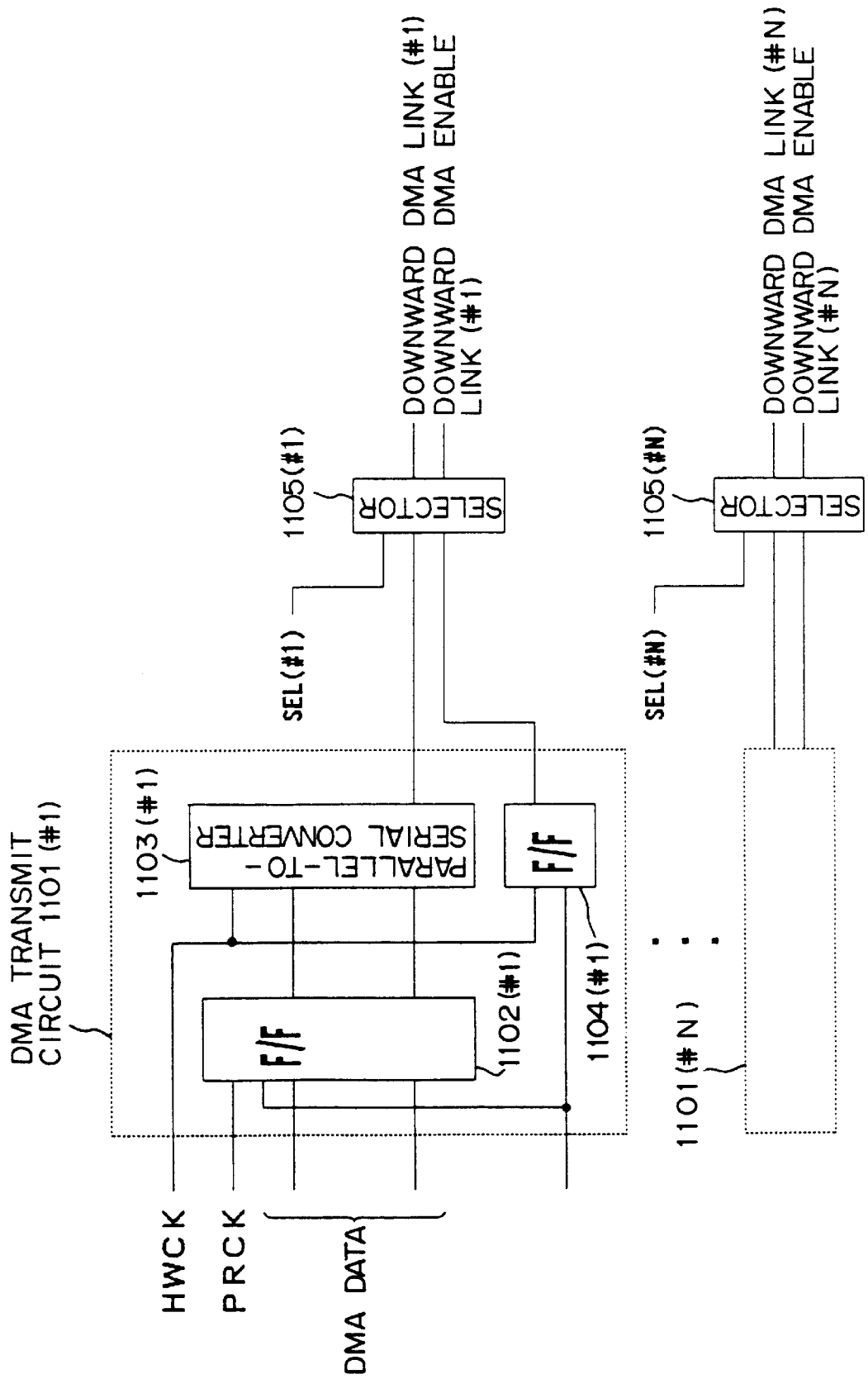
FIG. 11 is a block diagram showing a circuit configuration of a DMA data buffer in the DMADIS in the first preferred embodiment.
Figure 12:
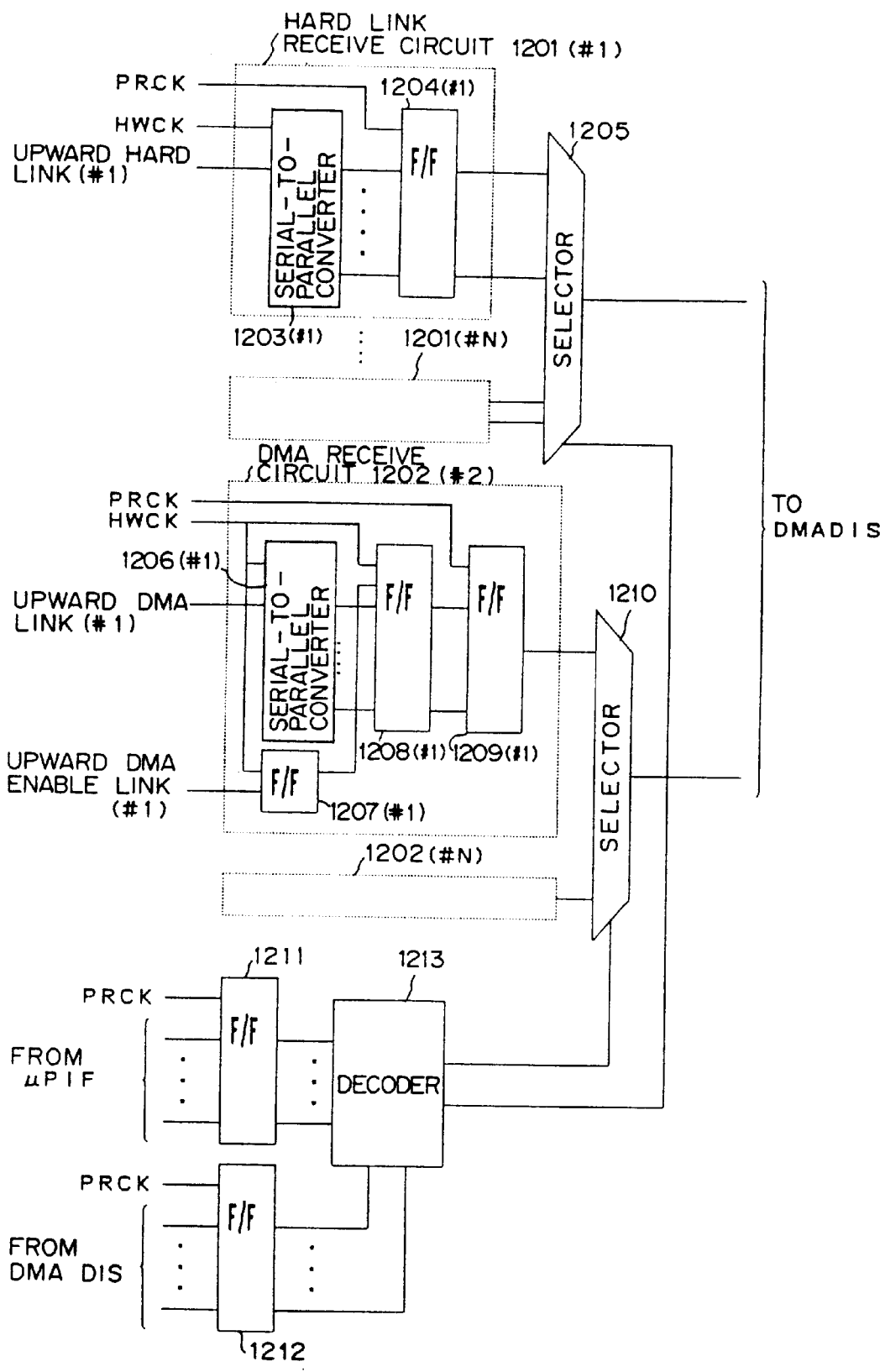
FIG. 12 is a block diagram showing a circuit configuration of the main part of the DMAT in the first preferred embodiment.

FIG. 9 is a block diagram showing a circuit configuration of a hard link transmitter (HLT) 515 in the DTCNV 511 of FIG. 5, FIG. 10 is a block diagram showing a circuit configuration of a DMA data bus section 519 of the DMA-DIS 513 in the DTCNV 511 of FIG. 5, FIG. 11 is a block diagram showing a circuit configuration of a DMA transmitter (DMAT) 514 in the DTCNV 511 of FIG. 5, and FIG. 12 is a block diagram showing a circuit configuration of a control link receiver (RV) 516 in the DTCNV 511 of FIG. 5.

DMA Transfer Operation Activated by CPR 508

With reference to FIGS. 8 through 12, and FIG. 13 illustrating the DMA communications procedure, the configuration and operation when the CPR 508 activates DMA transfer for a terminal interface 502 will first be described in detail.

Figure 13:
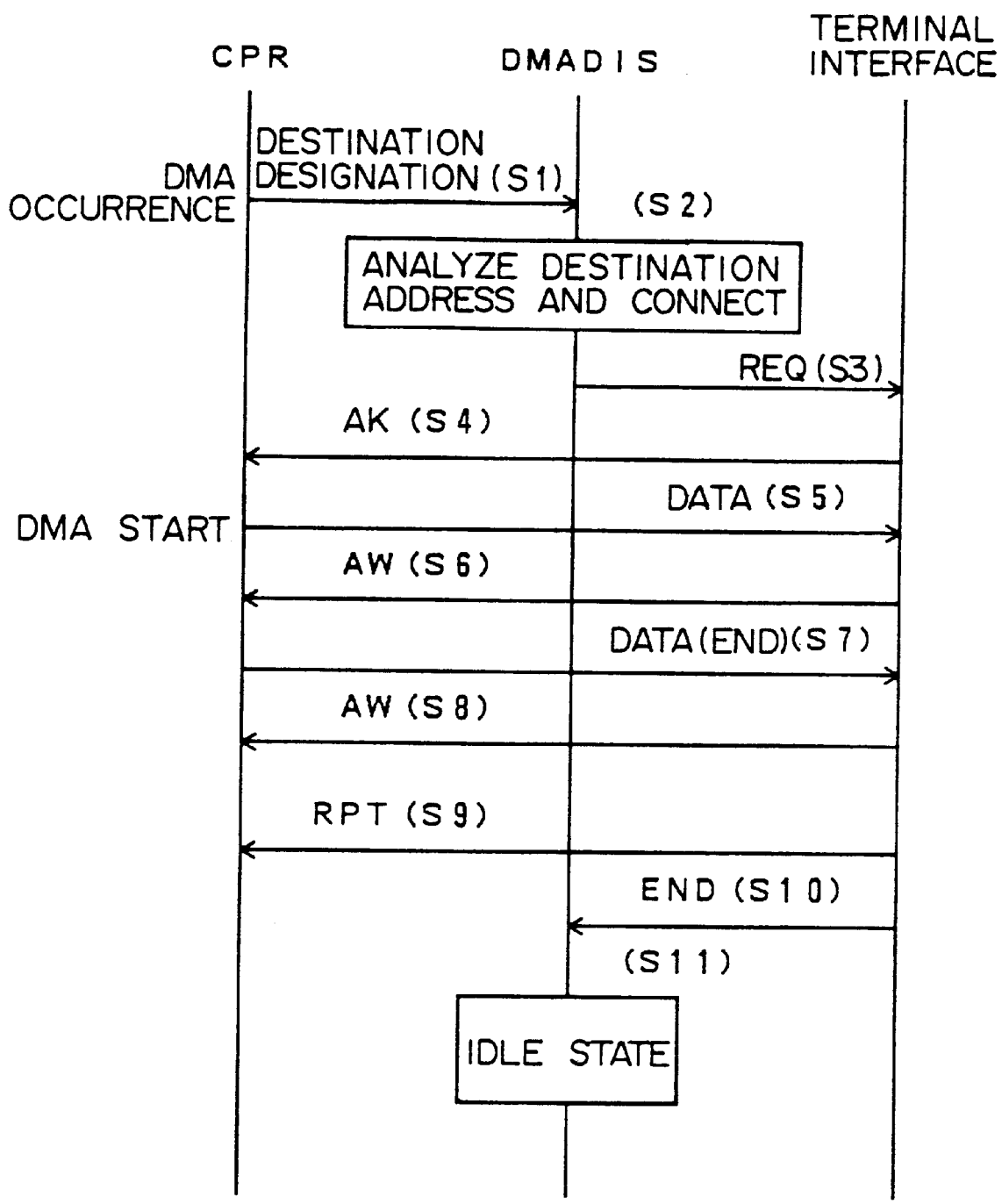
FIG. 13 is a diagram showing a DMA communications procedure (activation of DMA transfer by the CPR) in the first preferred embodiment.

When there arises a need to DMA transfer control data to a certain terminal interface 502, the CPR 508 transfers a packet having such a format as shown in FIG. 8 to the DMADIS 513 in the DTCNV 511 over the bus 509 and a processor interface (PRIF) 510 (S1 in FIG. 13).

The data packet has a format consisting of an address part and a real data part as shown in FIG. 8. The address part in a packet indicates the destination of the real data part in that packet. When a flag SW with which the address part begins as shown in FIG. 8 is zero, it indicates that control data (DMA data) to be DMA transferred is contained in the corresponding real data part. A link number in the address part specifies one of the terminal interfaces 502 (#1 to #N) for which DMA transfer is to be made. In the first preferred embodiment, the link number is represented by three bits of data in the address part, and hence N=2³=8.

The DMADIS 513 analyzes the address part in a received packet and knows which of the terminal interfaces 502 the DMA transfer has been activated for (S2 in FIG. 13). The DMADIS then sends a request signal (REQ) over the hard link in the downward control link 504d directed to the destination terminal interface (S3 in FIG. 13). Specifically, the DMADIS 513 transfers frame data (refer to (a-3) and (b-3) in FIG. 6) having the DMA request RQ placed into the DMA control field (refer to (a-1) and (b-1) in FIG. 6) as parallel data to one of hard link transmit circuits 901 (#1 to #N) in the HLT 515, which are shown in FIG. 9, that corresponds to the destination terminal interface 502. The frame data is latched by a flip-flop (F/F) 902 in the corresponding hard link transmit circuit 901 in synchronism with the processor clock PRCK from the CPR 508. After that, the latched frame data, which is parallel data having the format of FIG. 6(a), is converted into serial data by a parallel-to-serial converter 903 and sent over the hard link included in the down control link 504d (refer to FIG. 5) in synchronism with the highway clock HWCK (refer to FIG. 7(a)). In the parallel-to-serial converter 903, the serial data output timing is determined by the cell frame clock (refer to (b) and (d) in FIG. 7) though it is not particularly shown in FIG. 9.

In addition to the above operation, the DMADIS 513 loads into an F/F 1212 in the RV 516 shown in FIG. 12 in synchronism with the processor clock PRCK data that instructs the RV to monitor the hard link corresponding to the terminal interface 502 for which DAM transfer is to be made. A decoder 1213 decodes the contents of the F/F 1002 and causes a selector 1205 to select the only output of a hard link receive circuit 1201 that accommodates the hard link included in the up control link 504u to which that terminal interface 502 is connected. Thus, the DMADIS 513 is permitted to wait for only an answer signal from the terminal interface 502 for which DMA transfer is to be made (S4 in FIG. 13).

The destination terminal interface 502 takes into it only frame data which has been transferred over the hard link included in the corresponding down control link 504d which shows a match between the address (FIG. 6(a-1)) in that frame data and its own address. When recognizing that the DMA request RQ (refer to (a-3) in FIG. 6) has been set in the DMA control field in the frame data, the terminal interface 502 sends an acknowledge signal (ACK) over the hard link in the corresponding up control link 504u after it has made sure that it is able to make DMA transfer (S4 in FIG. 13). Specifically, the terminal interface 502 sends serial frame data (refer to FIG. 6) in which the acknowledgment AK has been placed in its DMA control field over the hard link in the upward control link 504u.

In the hard link receive circuit 1201 that accommodates the hard link included in the upward control link 504u which connects to that terminal interface 502, a serial-to-parallel converter 1003 receives serial data for one frame and converts it into parallel data in synchronism with the highway clock HWCK. In the serial-to-parallel converter 1203, the serial data receive timing for the head of the frame data is determined by the cell frame clock (refer to FIGS. 7(b) and (d)) though it is not particularly shown in FIG. 10. The resulting parallel frame data are loaded into the F/F 1204 in synchronism with the processor clock PRCK, then outputted to the DMADIS 513 via the selector 1205.

While waiting for an acknowledge signal (ACK) from the terminal interface 502 for which DMA transfer is to be made, the DMADIS 513 holds the first DMA data contained in the real data part (refer to FIG. 8) in the first packet by an F/F 1101 shown in FIG. 11 in synchronism with the processor clock PRCK. At the same time, the DMA enable signal (refer to FIG. 7(f)) to be sent over the DMA enable link is loaded into an F/F 1102 shown in FIG. 11.

When recognizing that an acknowledgment AK (refer to (b-3) in FIG. 6) has been placed in the control field in frame data from the RV 516, the DMADIS 513 stops sending the request signal (REQ) over the hard link in the down control link 504d for the corresponding terminal interface 502. Specifically, the DMADIS 513 transfers frame data (see (a-1) and (a-3) in FIG. 6) in which the DMA request RQ in the DMA control field has been reset as parallel data to one of the hard link transmit circuits 901 (#1 to #N) in the HLT 515 of FIG. 9 that corresponds to the destination terminal interface 502.

Moreover, the DMADIS 513 sends the DMA data and the DMA enable signal respectively latched by the F/F 11901 and the F/F 1102 shown in FIG. 11 over the DMA link and the DMA enable link in the downward control link 504d corresponding to the destination terminal interface 502 (S5 in FIG. 13). Specifically, the DMADIS 513 sends the DMA data and the DMA enable signal set by the F/F 1101 and the F/F 1102 as parallel data to one of DMA transmit circuits 1101, shown in FIG. 11, in the DMA transmitter (DMAT) 514 in the DTCNV 511 that corresponds to the destination terminal interface 502 and outputs a select signal SEL to a selector 1105 to which the output of that DMA transmit circuit is connected. The DMA data is latched by an F/F 1102 in the corresponding DMA transmit circuit 1101 shown in FIG. 11 in synchronism with the processor clock PRCK and the DMA enable signal. After that, the DMA data latched by the F/F 1102 in the form of parallel data is converted into serial data which, in turn, is sent over the DMA link included in the down control link 504d (see FIG. 5) through the selector 1105 in synchronism with the highway clock HWCK (refer to FIG. 7(e)). Note that, in this case, the transfer of the DMA data is made in synchronism with the highway clock HWCK only, but it is not related to the cell frame clock (FIG. 7(b)). At the same time, the DMA enable signal, which has been latched by the F/F 1104 in the DMA transmit circuit 1101 in synchronism with the highway clock HWCK, is sent over the DMA enable link included in the down control link 504d through the selector 1105 (refer to (f) in FIG. 7).

Furthermore, the DMADIS 513 returns to the CPR 508 a packet (refer to FIG. 8) in which the corresponding link number is contained in its address part and the acknowledge signal (ACK) is contained in its real data part.

Upon receipt of the acknowledge signal (ACK) from the DMADIS 513, the CPR 508 prepares DMA data to be transferred next, creates a packet in which that DMA data is contained in its real data part and the destination of the DMA data is contained in its address part, and transmits it to the DMADIS 513. Then, the DMADIS 513 receives that packet and places the next DMA data contained in its real data part into the F/F 1101 shown in FIG. 11.

Further, the DMADIS 513 places data that instructs the RV 516 to monitor the hard link for the terminal interface 502 for which DMA transfer is to be made into the F/F 1212 of FIG. 12 in the RV 516 in synchronism with the processor clock PRCK. Then, the decoder 1213 of FIG. 12 decodes the contents of the F/F 1212 and causes the selector 1005 to select only the output of the hard link receive circuit 1201 that accommodates the hard link included in the upward control link 504u which is connected to that terminal interface 502. Thereby, the DMADIS 513 is permitted to wait for only an answer signal from the terminal interface 502 for which DMA transfer is to be made (S6 in FIG. 13).

The destination terminal interface 502 begins to receive the DMA data (refer to (e) in FIG. 7) from the DMA link included in the corresponding down control link 504d in synchronism with the highway clock at the time (see (f) in FIG. 7) the DMA enable signal is output onto the DMA enable link included in that down control link 504d (S5 in FIG. 13). When the terminal interface 502 checks the received DMA data for errors in the upper layer and makes sure that the DMA data is valid, it sends an answer signal (AW) over the hard link in the corresponding up control link 504u (S6 in FIG. 13). Specifically, the terminal interface 502 sends over the hard link in the up control link 504u serial frame data (see (b-1) and (b-3) in FIG. 6) in which an acknowledgment AK has been placed in its DMA control field.

In the RV 516, the hard link receive circuit 1201 of FIG. 12 that accommodates the hard link included in the up control link 504u connected to the terminal interface 502 converts the frame data into parallel data and provides it to the DMADIS 513 through the selector 1205 as described previously.

When recognizing that the acknowledgment AK (refer to FIG. 6(b-3)) has been placed into the DMA control field in the frame data received from the RV 516, the DMADIS 513 resends the DMA data and the DMA enable signal latched into the F/F 1101 and 1102 shown in FIG. 11 over the DMA link and the DMA enable link in the down control link 504d corresponding to the terminal interface 502 through the DMAT 514 in the same manner as described previously (repetition of S5 in FIG. 13).

Further, the DMADIS 513 returns to the CPR 508 a packet in which the link number is contained in its address part and an answer signal (AW) is contained in its real data part.

Upon receipt of the answer signal (AW) from the DMADIS 513, the CPR 508 further prepares DMA data to be DMA transferred, creates a packet in which that DMA data is contained in its real data part and the destination of the DMA data is contained in its address part, and transmits it to the DMADIS 513. The DMADIS 513 receives that packet and then loads the next DMA data contained in its real data part into the F/F 1101 shown in FIG. 11 to continue the processing.

In the manner as described previously, the processes S5 and S6 of FIG. 13 are repeated. Upon receipt of the final DMA data (S7 in FIG. 13), the destination terminal interface 502 sends an answer signal (AW) over the hard link in the corresponding upward control link 504u in the manner as described previously (S8 in FIG. 13), sends control data (RPT) indicating a terminated DMA transfer state using, for example, a bit (particularly not shown) in the control bits in frame data on the hard link (S9 in FIG. 13), and sends an end signal (END) indicating the end of the DMA transfer over that hard link (S10 in FIG. 13). Specifically, the terminal interface 502 sends over the hard link in the upward control link 504u frame data (see (b-1) and (b-3) in FIG. 6) that is serial data in which an end flag (EF) has been set in the DMA control field.

In the RV 516, the hard link receive circuit 1201 of FIG. 12 that accommodates the hard link included in the upward control link 504u to which the terminal interface 502 connects converts the frame data into parallel data and provides it to the DMADIS 513 through the selector 1205 as described previously.

Making sure that the end flag EF (refer to FIG. 6(b-3)) has been set in the DMA control field in the frame data received from the RV 516, the DMADIS 513 changes its state to a DMA transfer enable state (idle state) and then terminates the DMA transfer (S11 in FIG. 13).

DMA Transfer Operation Activated by Terminal Interface 502

Figure 14:
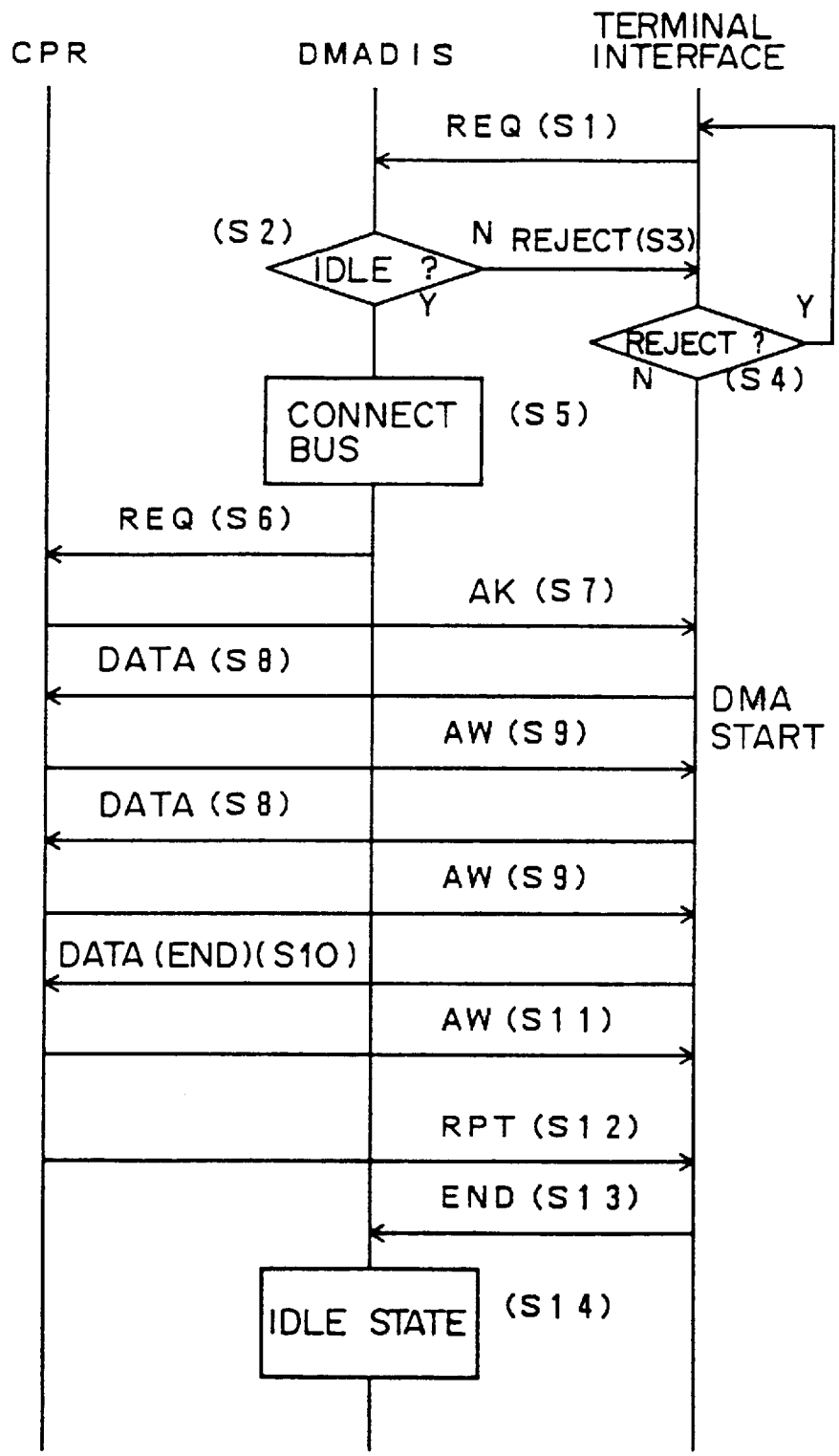
FIG. 14 is a diagram showing a DMA communications procedure (activation of DMA transfer by a terminal interface) in the first preferred embodiment.

Next, reference will be made to FIG. 14 illustrating a DMA communications procedure to describe the configuration and operation in detail when a terminal interface activates DMA transfer for the CPR.

When there arises a need of DMA transferring control data to the CPR 508, a certain terminal interface 502 sends a request signal (REQ) over the hard link in the upward control link 504u to which that terminal interface is connected (S1 in FIG. 14). Specifically, the terminal interface 502 sends over the hard link in the upward control link 504u frame data (see (b-1) and (b-3) in FIG. 6) that is serial data in which the corresponding DMA link number has been placed in its DMA control field.

During a time interval in which no DMA transfer is made, a microprocessor (μP) 518 in the switch controller (SWCNT) 512 loads cyclically data for instructing to monitor each of the hard links included in the up control links 504u respectively connected to the terminal interfaces 502 (#1 to #N) into the F/F 1211 in the RV 516 of the DTCNV 511 via the bus 519 and a microprocessor interface (μPIF) 550. As a result, the decoder 1213 decodes the contents of the F/F 1211 in sequence to cause the selector 1205 to select each of the outputs of the hard link receive circuits 1201 that accommodate the hard links included in the upward control links 504u connected to the terminal interfaces 502 (#1 to #N) in sequence and repeatedly. Each of the hard link receive circuits 1201 converts frame data into parallel data and provides it to the DMADIS 513 via the selector 1205 as described previously. Thus, the DMADIS is permitted to monitor control data on each of the hard links corresponding to the terminal interfaces 502 in sequence.

When the DMADIS 513 makes sure that a DMA request (refer to (b-3) in FIG. 6) has been placed in the DMA control field in frame data received from the RV 516, it makes a decision as to whether or not it is now in the DMA transfer enable state (idle state) (S2 in FIG. 14).

If the decision is that the DMADIS is not in the DMA transfer enable state, then it analyzes the address in the received frame data to know which terminal interface has made a request for DMA transfer and then sends a reject signal over the hard link in the downward control link 504d corresponding to the relevant terminal interface (S3 in FIG. 14).

Specifically, the DMADIS 513 transfers frame data (refer to (a-1) and (a-3) in FIG. 6) in which a reject indication RJ has been placed in its control field to that circuit of the hard link transmit circuits 901 (#1 to #N) in the HLT 515 which corresponds to the terminal interface 502 that has made a request for DMA transfer.

The terminal interface 502 that made a request for DMA transfer takes into it only frame data which, of frame data received from the hard link in the corresponding downward control link 504d, shows a match between the address (FIG. 6(a-1)) specified in the frame data and its own address. After that, when the terminal interface 502 knows that the reject indication RJ has been set in the DMA control field in the frame data (S4 in FIG. 14, it retransmits a request signal (REQ) for DMA transfer over the hard link in the corresponding upward control link 504u after a lapse of a given time (repetition of S1 in FIG. 14).

On the other hand, when the DMADIS 513 is in the DMA transfer enable state (idle state), it connects itself to the bus 509 via the PRIF 510 (S5 in FIG. 14) and then transfers to the CPR 508 a packet (refer to FIG. 8) in which the address of the terminal interface that has made a request for DMA transfer is placed into the address part and the request signal (REQ) from that terminal interface 502 is contained in the real data part (S6 in FIG. 14).

After that, the DMADIS 513 receives from the CPR 508 a packet in which the address of the terminal interface 502 that has made a request for DMA transfer is placed into the address part and an acknowledge signal (ACK) is contained in the real data part and then transmits the acknowledge signal (ACK) over the hard link in the downward control link 504d corresponding to that terminal interface 502 (S7 in FIG. 14). Specifically, the DMADIS 513 transfers frame data (refer to (a-1) and (a-3) in FIG. 6) in which an acknowledgment (ACK) has been placed in the DMA control field to a circuit which, of the hard link transmit circuits 901 (#1 to #N) in the HLT 515 shown in FIG. 9, corresponds to the terminal interface 502 that has made a request for DMA transfer.

In addition, the DMADIS 513 places data instructing to monitor the DMA link and the DMA enable link corresponding to the terminal interface 502 that is to make DMA transfer into the F/F 1212 in the RV 516 shown in FIG. 12 in synchronism with the processor clock PRCK. As a result, the decoder 1213 decodes the contents of the F/F 1212 to thereby cause the selector 1210 to select only the output of the DMA receiver circuit 1002 that accommodates the DMA link and the DMA enable link in the upward control link 504u connected to that terminal interface 502. Thus, the DMADIS 513 is permitted to wait for only DMA data from the terminal interface 502 that is to make DMA transfer (S8 in FIG. 14).

The terminal interface 502 that has made a request for DMA transfer takes into it only frame data which, of frame data received from the hard link included in the corresponding downward control link, shows a match between the address (FIG. 6(a-1)) specified in the frame data and its own address. After that, the terminal interface 502 recognizes that the acknowledgment AK has been placed in the DMA control field in the frame data (S7 in FIG. 14) and then starts the transfer of DMA data (S8 in FIG. 14). Specifically, the terminal interface 502 sends a sequence of DMA data over the DMA link included in the corresponding upward control link 504u in synchronism with the highway clock and sends a DMA enable signal over the DMA enable link in that upward control link 504U in synchronism with the start of the transfer of DMA data (refer to (a), (e) and (f) in FIG. 7).

In the DMA receive circuit 1202 of FIG. 12 that accommodates the DMA link and the DMA enable link included in the upward control link 504u connected to the terminal interface 502, the F/F 1207 repeatedly latches the DMA enable signal sent over the DMA enable link in synchronism with the highway clock HWCK. The serial-to-parallel converter 1006 receives the frame data and converts it into parallel data in synchronism with the highway clock HWCK. The resulting parallel frame data is latched into the F/F 1208 in synchronism with the processor clock PRCK and the DMA enable signal latched by the F/F 1207. The output of the F/F 1208 is applied to the DMADIS 513 via the selector 1210.

The DMADIS 513 creates a packet (refer to FIG. 8) in which the address of the terminal interface 502 that is making DMA transfer is placed into the address part and DMA data received from the RV 516 is contained in the real data part and then transfers it to the CPR 508 through the PRIF 510 and the bus 509 (S8 in FIG. 14).

Upon receipt of this packet, the CPR 508 verifies the validity of the DMA data on the basis of the result of error checking in the upper layer for the DMA data contained in the real data part in the received packet and then transmits to the DMADIS 513 a packet in which the address of the terminal interface 502 that is making DMA transfer is placed into its address part and an answer signal (AW) is contained in its real data part. The DMADIS 513 receives that packet and then sends an answer signal (AW) over the hard link in the down control link 504d corresponding to the relevant terminal interface 502 (S9 in FIG. 14). Specifically, the DMADIS 513 transfers frame data (refer to (a-1) and (a-3) in FIG. 6) in which the acknowledgment AK has been placed in its control field to a circuit which, of the hard link transmit circuits 901 (#1 to #N) of FIG. 9 in the HLT 515, corresponds to the terminal interface 502 that is making DMA transfer.

When making sure that the acknowledgment AK (refer to FIG. 6(b-3)) has been placed in the DMA control field of the frame data received from the hard link in the downward control link 504d, the terminal interface 502 that is making DMA transfer makes a transfer of next DMA data (repetition of S8 in FIG. 14).

The processes of S8 and S9 in FIG. 14 are repeated in the above manner. Upon receipt of the last DMA data (S10 in FIG. 14), the CPR 508 transmits an answer signal (AW) to the terminal interface 502 that is making DMA transfer as described previously (S11 in FIG. 14) and then transmits control data (RPT) indicating the terminated DMA transfer state (S12 in FIG. 14).

The DMADIS 513 sends the control data over the hard link included in the downward control link 504d connected to the terminal interface 502 that is making DMA transfer via the HLT 515 as described previously. The control data (RPT) indicating the terminated DMA transfer state is transmitted using a bit which, of the control bits in frame data over the hard link, is not shown particularly.

Further, the DMADIS 513 loads data instructing to monitor the hard link corresponding to the terminal interface 502 that is making DMA transfer into the F/F 1212 of FIG. 12 in the RV 516 in synchronism with the processor clock PRCK. As a result, the decoder 1213 in FIG. 12 decodes the contents of the F/F 1212 to thereby cause the selector 1205 to select only the output of the hard link receive circuit 1201 that accommodates the hard link included in the upward control link 504u connected to that terminal interface 502.

Finally, the terminal interface 502 that was making DMA transfer sends an end signal (END) indicating the end of the DMA transfer over the hard link (S13 in FIG. 14). Specifically, the terminal interface 502 sends over the hard link in the upward control link 504u serial frame data (refer to (b-1) and (b-3) in FIG. 6) in which the end flag EF has been set in its DMA control field.

In the RV 516, the hard link receive circuit 1001 of FIG. 12 that accommodates the hard link included in the upward control link 504u connected to the terminal interface 502 converts the frame data into parallel data and provides it to the DMADIS 513 via the selector 1005 as described previously.

When making sure that the end flag EF has been set in the DMA control field of the frame data received from the RV 516, the DMADIS 513 changes its state to the DMA transfer enable state (idle state), thereby terminating the DMA transfer (S14 in FIG. 14).

Hard-Link-Based Control Data Communications between CPR 508 and Terminal Interface 502

Finally, the operation of control data communications between CPR 508 and terminal interface 502 using the hard link will be described.

When there arises a need of transferring control data to a certain terminal interface 502 over the corresponding hard link, the CPR 508 transfers to the DMADIS 513 in the DTCNV 511 via the bus 509 and the PRIF 510 shown in FIG. 5 a packet of a format as shown in FIG. 8 in which the flag SW in the address part is set to one and data required to transfer control data is placed into the real data part.

When recognizing that the flag SW in the address part in the received packet has been set to one, the DMADIS 513 transfers to the SWCNT 512 that packet as it is. The packet is then DMA transferred to a memory (not shown) in the SWCNT 512 by the DMA controller (DMAC) 517 in the SWCNT.

The microprocessor ($\mu$P) 518 in the SWCNT 512 determines what control data is to be transferred to which terminal interface on the basis of the data contained in the DMA transferred packet and then creates frame data (refer to (a-1) and (a-2) in FIG. 6) in which necessary data is placed into control bits.

The $\mu$P 518 transfers that frame data as parallel data to one of the hard link transmit circuits 901 (#1 to #N) of FIG. 9 in the HLT 515 that corresponds to the destination terminal interface 502. The frame data is loaded into the F/F 902 in the corresponding hard link transmit circuit 901 of FIG. 9 in synchronism with the processor clock PRCK from the CPR 508. After that, the parallel frame data having the format of FIG. 6(a) is converted by the parallel-to-serial converter 903 into serial data and sent over the hard link included in the downward control link 504d (refer to FIG. 5) in synchronism with the highway clock HWCK (refer to (a) in FIG. 7). As described previously, the transfer timing of the beginning of the serial frame data is determined by the cell frame clock which is not shown in FIG. 9 (see (b) and (d) in FIG. 7).

The destination terminal interface 502 takes into it only frame data which, of frame data received from the hard link included in the corresponding down control link 504d, shows a match between the address at the beginning of the frame data and its own address and fetches necessary control data from the control bits in the frame data (refer to FIG. 6(a-2)) for subsequent processing.

On the other hand, when there arises a need of transferring control data to the CPR 508 over the hard link, a certain terminal interface 502 produces frame data (refer to (b-1) and (b-2) in FIG. 6) in which necessary data are placed into control bits and sends it as serial data over the hard link included in the corresponding up control link 504u connected to the terminal interface 502.

As described previously, during a time interval in which no DMA transfer is being made, the $\mu$P 518 in the SWCNT 512 of FIG. 5 places data instructing to monitor the hard links included in the upward control links 504u connected to the terminal interfaces 502 (#1 to #N) in a cyclic manner into the F/F 1211 of FIG. 12 in the RV 516 via the bus 519 and the $\mu$PIF 550 in the DTCNV 511. And the decoder 1213 then decodes the contents of the F/F 1211 in sequence to thereby cause the selector 1205 to select each of the outputs of the hard link receive circuits 1201 that accommodate the hard links included in the upward control links 504u to which the #1 to #N terminal interfaces 502 are connected in sequence and in a cyclic manner. Each of the hard link receive circuits 1201 in the RV 516 converts frame data into parallel data and outputs it to the DMADIS 513 via the selector 1205 as described previously.

The DMADIS 513 transfers to the CPR 508 via the PRIF 510 and the bus 509 the frame data on the hard links included in the upward control links 504u which are output from the RV 516 in sequence.

In the above-described hard link control function, when frame data is sent over a hard link included in an upward control link 504u, control data, such as fault notification FT, DMA fault DF, etc., in control bits must be transferred with stability. To ensure stability, therefore, some control means will be needed. In the first preferred embodiment, frame data entered in synchronism with the high-speed highway clock HWCK is written into the F/F 1204 via the serial-to-parallel converter 1203 of FIG. 12 in the RV 516 in synchronism with the processor clock PRCK which is slower than the highway clock HWCK. Even if frame data are entered disturbed during one or two successive periods thereof, therefore, the contents of the F/F 1204 are immediately overwritten by subsequent frame data which will be entered with stability. Consequently, stable frame data can be fetched from the F/F 1204. Thus, in the first preferred embodiment, a simple circuit arrangement composed of a serial-to-parallel converter 1203 and an F/F 1204 allows frame data to be received with stability.

Also, the HLT 515 that sends frame data over the hard links included in the downward control links 504d can transmit frame data with stability assurance the use of a simple circuit arrangement composed of an F/F 902 and a parallel-to-serial converter 903.

Modifications of the First Preferred Embodiment

The first preferred embodiment described above relates to a system for transmitting frame data between terminal interfaces and a central processor unit. However, the present invention is not limited to such a system but can be applied to a system for transmitting control data between a control unit and various pieces of peripheral equipment in an exchange other than terminal interfaces.

In the first embodiment, the present invention is directed to an ATM exchange system. However, the present invention is not limited to such a system but can be applied to various exchange systems that receive subscriber information in synchronism with a predetermined highway clock and make information exchange.

Second Preferred Embodiment

Next, a description will be given of a second preferred embodiment of the present invention that is related with the second mode of the present invention shown in FIG. 4.

Figure 15:
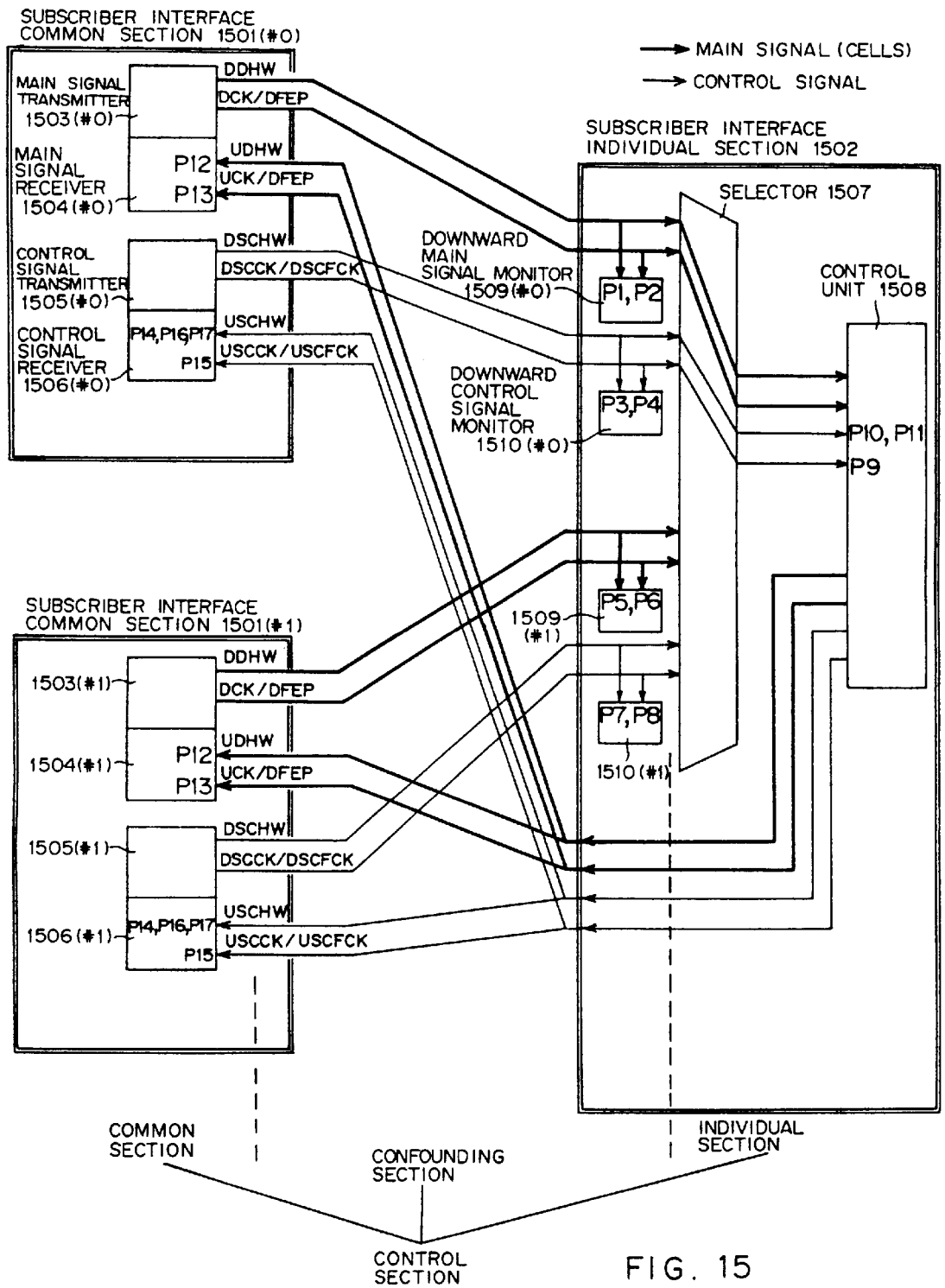
FIG. 15 is a block diagram showing a second preferred embodiment of the present invention.

FIG. 15 is a block diagram of the second preferred embodiment of the present invention. The second preferred embodiment is an application of the second mode of the invention to control signal communications between #0- and #1-system subscriber interface common sections 201 and a subscriber interface individual section 202, which are internal duplex devices within an ATM exchange.

The second preferred embodiment of the invention shown in FIG. 15 differs from the first preferred embodiment of the invention shown in FIG. 5 in that a subscriber control highway in FIG. 15 that corresponds to a control link 504 of FIG. 5 consisting of two physical lines- a hard link and a DMA link-consists of a single physical line.

In FIG. 15, each of the #0- and #1-system subscriber interface common sections 201 accommodates a plurality of subscriber interface individual sections 202, while each of the subscriber interface individual sections 202 accommodates a subscriber line.

The subscriber interface common section 201 and the subscriber interface individual section 202 are interconnected by a main signal (subscriber cells) transmission line indicated by a bold line and a control signal transmission line indicated by a fine line in FIG. 15.

The main signal transmission line consists of a downward data highway DDHW, a downward data clock DCK/DFEP, an upward data highway UDHW, and an upward data clock UCK/DFEP.

A main signal on the downward data highway DDHW and the downward data clock DCK/DFEP are transmitted by a main signal transmitter 203 in the subscriber interface common section 201 and received by a control unit 208 via a selector 207 in the subscriber interface individual section 202. A main signal on the upward data highway UDHW and the upward data clock UCK/DFEP are transmitted by the control unit 208 in the subscriber interface individual section 202 and received by a main signal receiver 204 in the subscriber interface common section 201.

The control signal transmission line, which is particularly related to the present invention, consists of a downward subscriber control highway DSCHW, a downward subscriber control frame clock DSCCK, a downward subscriber control frame clock DSCFC, an upward subscriber control highway USCHW, an upward subscriber control clock USCCK, and an upward subscriber control frame clock USCFCK. Note that the DSCCK, DSCFCK, USCCK and USCFCK clocks are each transmitted over respective individual physical transmission paths.

A control signal on the downward subscriber control highway DSCHW, the downward subscriber control clock DSCCK, and the downward subscriber control frame clock DSCFCK are transmitted by a control signal transmitter 205 in the subscriber interface common section 201 and received by the control unit 208 via a selector 207 in the subscriber interface individual section 202. A control signal on the upward subscriber control highway USCHW, the upward subscriber control clock USCCK, and the upward subscriber control frame clock USCFCK are transmitted by the control unit 208 in the subscriber interface individual section 202 and received by a control signal receiver 206 in the subscriber interface common section 201.

One of the #0- and #1-system subscriber interface common sections 201 operates as a master system and the other acts as a slave system and is on standby. In an example of FIG. 15, the #0-system subscriber interface common section 201 acts as a master system. In this case, the selector 207 in the subscriber interface individual section 202 selects the transmission line for the downward main signal/control signal sent from the #0-system subscriber interface common section 201 and connects it to the control unit 208. The upward main signal/control signal sent from the control unit 208 in the subscriber interface individual section 202 is transmitted in common to the #0- and #1-system subscriber interface common sections 201.

In the subscriber interface individual section 202, a downward main signal monitor 209 and a control signal monitor 210 provided to precede the selector 207 watch for a stack fault of a main signal on the downward data highway DDHW and a cut fault of the downward data clock DCK/DFEP, respectively.

<Data Format in the Second Preferred Embodiment>

Next, a data format for the control signal transmission line which is specially related to the present invention will be described.

Figure 16:
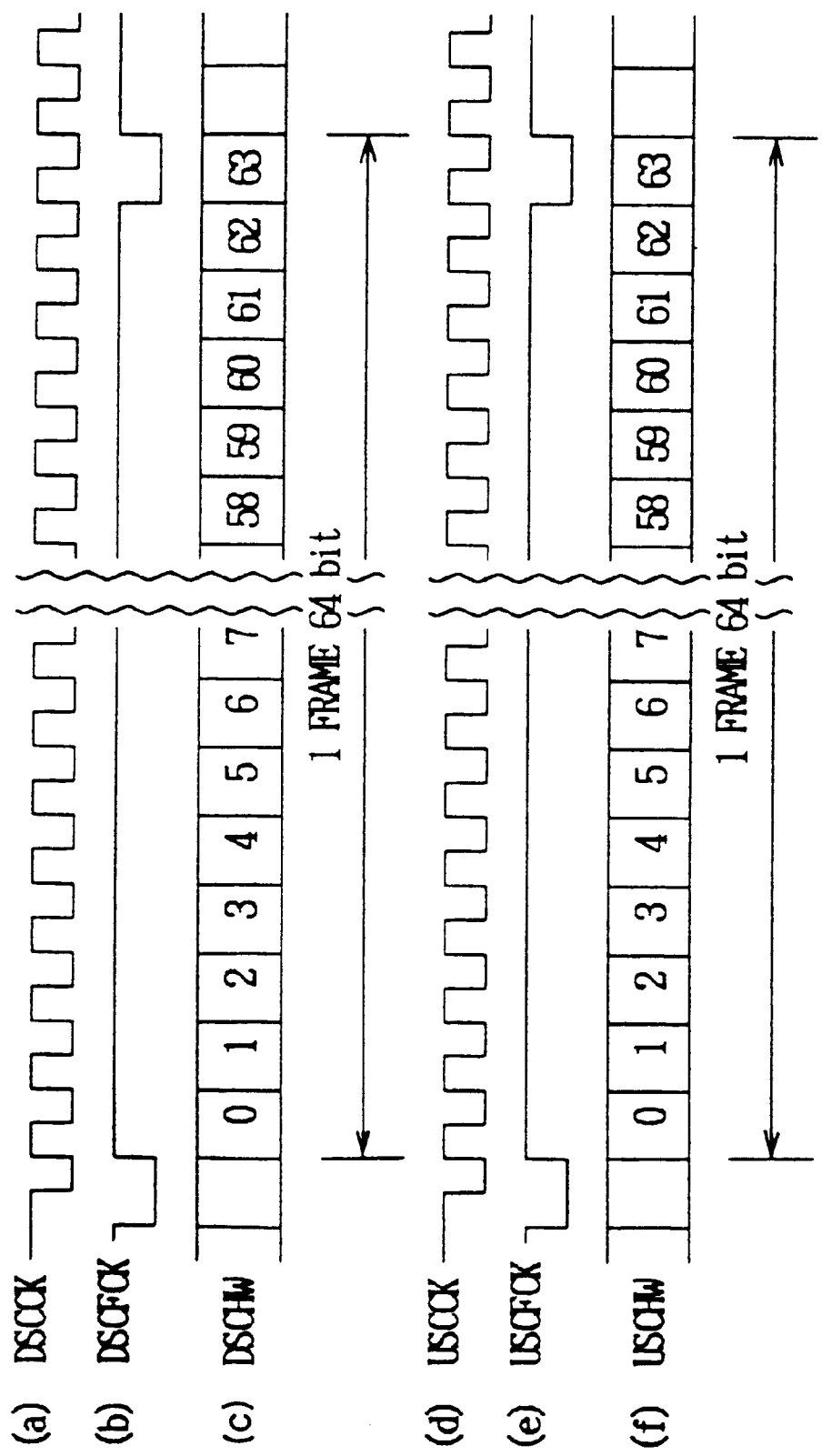
FIG. 16 is a diagram showing an operating timing chart of the second preferred embodiment of the present invention.

As shown at (c) and (f) in FIG. 16, the downward subscriber control highway DSCHW and the upward subscriber control highway USCHW each have a data format such that one frame is 64 bits in length.

The downward subscriber control clock DSCCK and the upward subscriber control clock USCCK in FIG. 15 are clock signals shown at (a) and (d) in FIG. 16, respectively, and define the transfer timing of each bit of data on the downward subscriber control highway DSCHW and the upward subscriber control highway USCHW, respectively.

The downward subscriber control frame clock DSCFCK and the upward subscriber control frame clock USCFCK in FIG. 15 are clock signals shown at (b) and (e) in FIG. 16, respectively, and delimit each frame of control data on the downward subscriber control highway DSCHW and the upward subscriber control highway USCHW, respectively.

Figure 17:
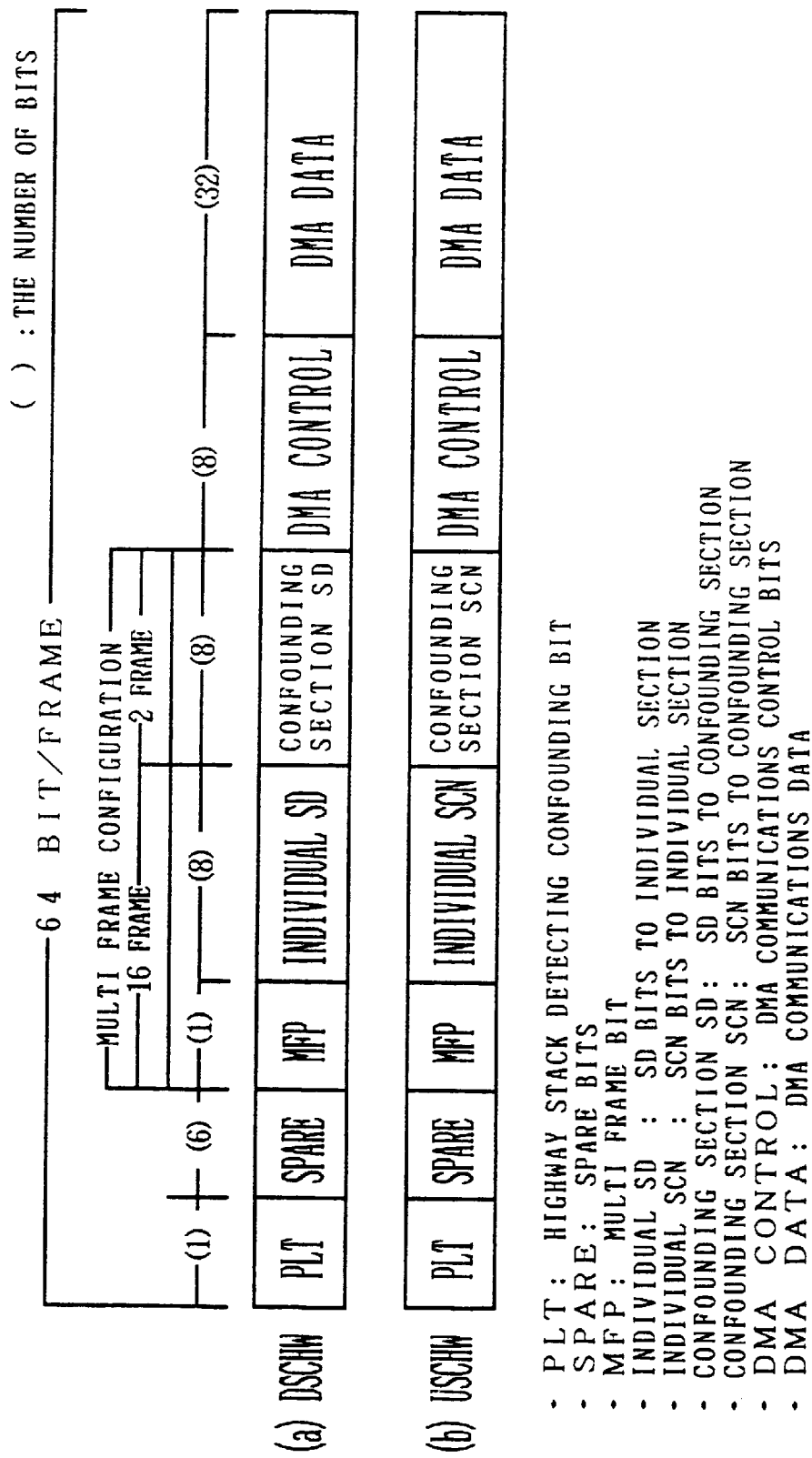
FIG. 17 is a diagram showing frame data formats in the second preferred embodiment of the present invention.

FIG. 17 shows at (a) and (b) data formats for one frame (64 bits) on the downward subscriber control highway DSCHW and the upward subscriber control highway USCHW. As is seen from FIG. 17, in the second preferred embodiment, it is a great feature related to the present invention that SD(signal drive)/SCN(scan) bit groups representing the states of bits of the respective control signals and DMA bit groups for transferring many control signals which may occur irregularly, such as subscriber traffic information, are defined on a time-division basis on the subscriber control highway dedicated to control signal transmission in units of a predetermined number of successive frames (multiframe) as a unit.

Hereinafter, the function of each of bits shown at (a) or (b) in FIG. 17 allocated to the downward subscriber control highway DSCHW and the upward subscriber control highway USCHW will be described in sequence.

<Functions of Bit Groups Having Real-Time Requirements>

First, the functions of a PLT bit, spare bits, an MFP bit, individual SD bits, individual SCN bits, confounding section SD bits, and confounding section SCN bits shown at (a) and (b) in FIG. 17, which have real-time requirements, will be described.

The Function of PLT Bit

The PLT bit that is allocated to bit 0 of a frame on each of the downward subscriber control highway DSCHW and the upward subscriber control highway USCHW is an alternating bit used to detect a stack fault on each highway. This bit is set to zero in even-numbered frames and to one in odd-numbered frames. The downward control signal monitor 210 of FIG. 15 detects a stack fault on the downward subscriber control highway DSCHW by recognizing that the PLT bit on the downward subscriber control highway DSHW will not alternate with each frame.

The Function of Spare Bits

The spare bits consist of six bits that are allocated to bits 1 to 6 of a frame on each of the downward subscriber control highway DSCHW and the upward subscriber control highway USCHW and serve as a spare area for signal drive data or scan data which is control signals communicated between the subscriber interface common section 201 and the subscriber interface individual section 202 shown in FIG. 15. As shown in FIG. 18, six types of signal drive data or scan data, i.e., spare 0 to spare 5, can be set up on the spare bits D0 to D5 of each frame.

The Function of MFP Bit

The MFP bit is allocated to bit 7 of a frame on each of the downward subscriber control highway DSCHW and the upward subscriber control highway USCHW and used to indicate a multiframe configuration. This bit is set to one in the starting frame in the multiframe configuration and to zero in other frames. In the second preferred embodiment, the number of frames in the multiframe configuration is 16, which corresponds to the number of frames for signal drive data or scan data in the individual section.

Functions of Individual SD Bits

The individual SD bits consist of eight bits that are allocated to bits 8 to 15 of a frame on the downward subscriber control highway DSCHW and indicate signal drive data which is control signals used for the subscriber interface common section 201 to control the selector 207 and the control unit 208 in the subscriber interface individual section 202.

As shown in the lower portion of FIG. 15, in order to perform control for each control section, the selector 207 and the control unit 208 in the subscriber interface individual section 202 are called an individual section, a highway portion between the subscriber interface common section 201 and the subscriber interface individual section 202 is called a confounding section, and the inside of the subscriber interface common section 201 is called a common section.

The individual SD bits have a multiframe configuration of 16 frames. The individual SD bits D0 to D7 in each of frame 0 to frame 15 in the multiframe configuration are assigned individual-section signal drive data indicated in a respective one of row 0 to row 15 shown in FIG. 19.

Individual section signal driver data include data which are common to all the subscriber interface individual sections 202 connected to the subscriber interface common sections 201 and indicated in frame 0 and frame 1 (see (1) and (2) in FIG. 19) in the multiframe configuration and data which are inherent in each subscriber interface individual section 202 and indicated in frame 2 to frame 15 in the multiframe configuration (see (3) in FIG. 19).

The individual section signal drive data indicated in frame 0 in the multiframe configuration are broadcast data which are set to the same value for all the subscriber interface individual sections 202 connected to the subscriber interface common section 201.

Of the individual section signal drive data indicated in frame 0, data 15MIN (15 minutes) is used to inform each subscriber interface individual section 202 of a lapse of time every 15 minutes as the criterion in acquiring traffic information of each subscriber. The data 15MIN goes to one with each lapse of 15 minutes.

Next, data FRST (fault reset) is used for resetting fault data set in the subscriber interface individual section 202. This data is set to zero when resetting is activated; otherwise, it is set to one.

Moreover, data HRST (hardware reset) is used for hardware-resetting the state of the subscriber interface individual section 202. This data is set to zero when resetting is activated; otherwise, it is set to one. After the hardware-resetting, the state of the subscriber interface individual section 202 is the same as the state immediately after power on.

Furthermore, individual section signal drive data indicated in frame 1 (FIG. 19(2)) in the multiframe configuration are common to all the subscriber interface individual sections 202 connected to the subscriber interface common section 201. However, each piece of data in frame 1 may be set to a value corresponding to a respective one of the subscriber interface individual sections 202.

Of the individual section signal drive data indicated in frame 1, data CBCLP (cell by cell loop) is used to instruct the subscriber interface individual section 202 to loop only test cells of cells sent from the subscriber interface common section 201 to it over the downward data highway DDHW back to the subscriber interface individual section 202. This data is set to zero when loopback of test cells is instructed; otherwise, it is set to one.

Individual section signal drive data ALLP (all cell loop) is used to instruct the subscriber interface individual section 202 to loop all cells transferred to it over the downward data highway DDHW back from the subscriber interface common section 201. This data is set to zero when loopback of all of cells is instructed; otherwise, it is set to one.

Individual section signal drive data TEST is used to instruct the subscriber interface individual section 202 to start its testing operation. This data is set to zero when the testing operation is to be started; otherwise, it is set to one.

Individual section signal drive data FRST (fault reset) is the same in function as the data FRST in frame 0 but used to reset fault data set in only the relevant subscriber interface individual section.

Individual section signal drive data PRSTA (processor reset type A) and PRSTB (processor reset type B) are data used for respectively performing first and second types of resets on the microprocessor in the control unit 208 of the subscriber interface individual section 202. These pieces of data are each set to zero when a reset is performed; otherwise, they are set to one.

Individual section signal drive data HRST (hardware reset) is the same in function as the data HRST in frame 0 but is used for hardware-resetting of the state of only the relevant subscriber interface individual section.

Individual-section signal drive data indicated in frame 2 to frame 15 (refer to (3) in FIG. 19) in the multiframe configuration vary with the types of subscriber interface individual sections 202; thus, the detailed description thereof is omitted.

The Functions of Individual SCN Bits

The individual SCN bits (refer to (b) in FIG. 17) allocated to bit 8 to bit 15 (eight bits) on the upward subscriber control highway USCHW indicate scan data or control signals used for the subscriber interface individual section 202 of FIG. 15 to notify the subscriber interface common section 201 of a fault and the like.

Like the individual SD bits, the individual SCN bits have a multiframe configuration consisting of 16 frames. The individual SCN bits D0 to D7 in each of frame 0 to frame 15 in the multiframe configuration indicate individual-section scan data in a corresponding one of row 0 to row 15 shown in FIG. 20.

Of the individual section scan data, data indicated in frame 0 and frame 1 ((1) in FIG. 20) in the multiframe configuration are basically echoes of the individual signal drive data indicated in frame 0 and frame 1 (refer to (1) and (2) of FIG. 19) in the multiframe configuration on the downward subscriber control highway DSCHW. Individual section scan data ACT0 in frame 0 is set to zero when, in FIG. 15, the #0-system subscriber interface common section 201 is currently the master system and the selector 207 in the subscriber interface individual section 202 selects signals from the #0-system subscriber interface common section 201; otherwise, it is set to one. Conversely, individual section scan data ACT1 in frame 0 is set to zero when the #1-system subscriber interface common section 201 is currently the master system and the selector 207 in the subscriber interface individual section 202 selects signals from the #1-system subscriber interface common section 201; otherwise, it is set to one.

Next, individual section scan data indicated in frame 2 and frame 3 ((2) of FIG. 20) in the multiframe configuration are common to all the subscriber interface individual sections 202 connected to the subscriber interface common section 201.

Of the individual section scan data, data PWCB ID (package wiring circuit board identification) indicated in frame 2 is 8-bit data indicating the identification number of a subscriber interface individual section 202.

Of the individual section scan data indicated in frame 3, data FSYC (frame clock synchronization) indicates a fault of the downward subscriber control frame clock DSCFCK getting out of sync, This data is set to zero when such a fault is indicated; otherwise, it is set to one. As shown as P9 in FIG. 15 or 24, the control unit 208 in the subscriber interface individual section 202 monitors the downward subscriber control frame clock DFCFCK and sets the data FSYC to zero when it detects lack of synchronization of the frame clock.

The individual section scan data 2FSYC (2 frame synchronization) is data to indicate a fault that even-numbered and odd-numbered frames are out of sync. This data is set to zero when such a fault is indicated; otherwise, it is set to one. As described previously, the PLT bit ((a) of FIG. 17) allocated to the downward subscriber control highway DSCHW is set to zero in even-numbered frames and to one in odd-numbered frames. As shown as P10 in FIG. 15 or 24, the control unit 208 in the subscriber interface individual section 202 monitors changes in the PLT-bit value and sets the data 2FSYC to zero when it detects that even-numbered and odd-numbered frames are out of sync.

The individual section scan data 16FSYC (16-frame synchronization) is data to indicate a fault in which 16 frames in the multiframe configuration on the downward subscriber control highway DSCHW are out of sync. This data is set to zero when such a fault is indicated; otherwise, it is set to one. As described previously, the MFP bit ((a) of FIG. 17) allocated to the downward subscriber control highway DSCHW is set to one in the starting frame in the multiframe configuration and to zero in the other frames. As shown as P11 in FIG. 15 or 24, the control unit 208 in the subscriber interface individual section 202 monitors changes in the MFP-bit value and sets the individual section scan data 16FSYC to zero when it detects a fault in which 16 frames in the multiframe configuration are out of sync.

The individual section scan data WPFLT (write protect fault) is data to indicate that a write protection fault has occurred in writing into memory in the subscriber interface individual section 202. This data is set to zero when such a fault is indicated; otherwise, it is set to one.

The individual section scan data WDFLT (watch dog timer fault) is data to indicate that an overflow has occurred in a watch dog timer in the subscriber interface individual section 202. This data is set to zero when such a fault is indicated; otherwise, it is set to one.

The individual section scan data $\mu$MFLT (microprocessor memory parity fault) is data to indicate that a memory parity fault has occurred in the microprocessor in the control unit 208 of the subscriber interface individual section 202. This data is set to zero when such a fault is indicated; otherwise, it is set to one.

Individual section scan data indicated in frame 4 to frame 15 ((3) of FIG. 20) in the multiframe configuration are of inherent types in the respective subscriber interface individual sections 202 connected to the subscriber interface common section 201. The contents of the data vary with types of subscriber interface individual sections and hence descriptions in detail thereof are omitted.

Functions of Confounding-Section SD Bits

The confounding-section SD bits (FIG. 17(*a*)) allocated to bit 16 to bit 23 (eight bits) in a frame on the downward subscriber control highway DSCHW indicate signal drive data or control signals by which the subscriber interface common section 201 controls the downward main signal monitor 209 and the downward control signal monitor 210 in the subscriber interface individual section 202. The downward main signal monitor 209 and the downward control signal monitor 210 monitor the state of the confounding section which is a highway portion between the subscriber interface common section 201 and the subscriber interface individual section 202.

The confounding-section SD bits have a multiframe configuration of two frames. The confounding-section SD bits D0 to D7 in frame 0 and frame 1 in the multiframe configuration indicate confounding-section signal drive data in row 0 and row 1 shown in FIG. 21.

Of the confounding section signal drive data shown in frame 0, data LPBC (loop back cell by cell) is data for instructing a loopback section (not shown) provided to precede the selector 207 in the subscriber interface individual section 202 (i.e., on the input side of the selector) to loop back only test cells of cells transferred from the subscriber interface common section to the subscriber interface individual section over the downward data highway DDHW. The data is set to zero when the loopback of test cells is told; otherwise, it is set to one.

The confounding section signal drive data PFCC (pseudo fault for cell clock) indicates to the downward main signal monitor 209 in the subscriber interface individual section 202 a pseudo fault indicating that the downward data clock DCK/DFEP has been cut. This data is set to zero when that pseudo fault is indicated; otherwise, it is set to one.

The confounding section signal drive data PFCP (pseudo fault for cell parity) indicates to the downward main signal monitor 209 in the subscriber interface individual section 202 a pseudo fault indicating a parity error on the downward data highway DDHW. This data is set to zero when that pseudo fault is indicated; otherwise, it is set to one.

The confounding section signal drive data PFSC (pseudo fault for downward subscriber control clock) indicates to the downward control signal monitor 210 in the subscriber interface individual section 202 a pseudo fault indicating the interruption of the downward subscriber control clock DSCCK and the downward subscriber control frame clock DSCFCK. This data is set to zero when that pseudo fault is indicated; otherwise, it is set to one.

The confounding section signal drive data PFSD (pseudo fault for downward subscriber control data) indicates to the downward control signal monitor 210 in the subscriber interface individual section 202 a pseudo fault indicating that control signals are stuck on the downward subscriber control highway DSCHW. This data is set to zero when that pseudo fault is indicated; otherwise, it is set to one.

The confounding section signal drive data FRST (fault reset) is data for resetting fault data set in each device in the confounding section in the subscriber interface individual section 202. This data is set to zero when the resetting is activated; otherwise, it is set to one.

The confounding section signal drive data HRST (hardware reset) is data for hardware resetting the sate of each device in the confounding section in the subscriber interface individual section 202. This data is set to zero when the resetting is activated; otherwise, it is set to one. After the hardware resetting, the state of each device becomes the same as the state immediately after power on.

Figure 23:
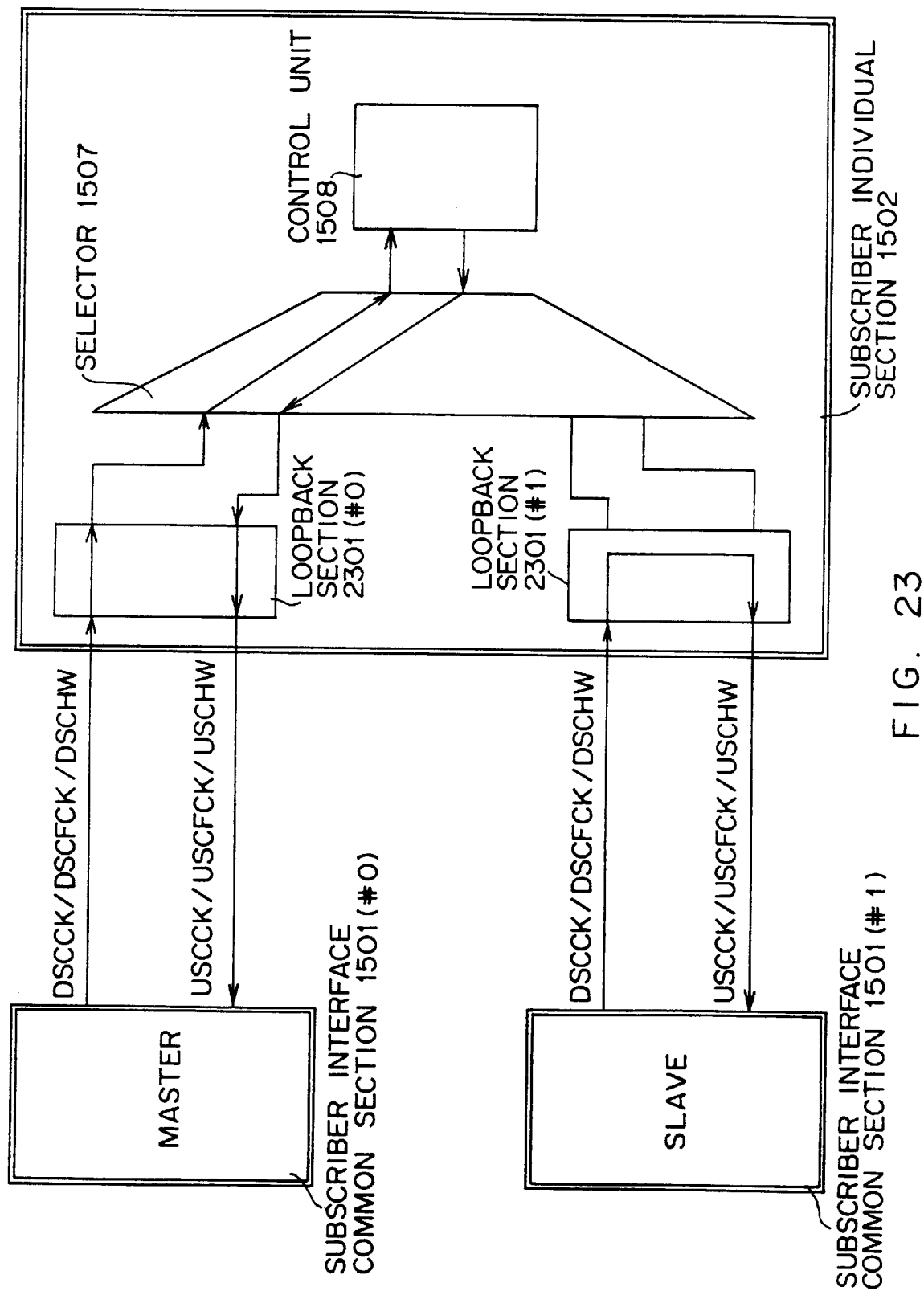
FIG. 23 is a diagram showing loopback operation of control signals in the second preferred embodiment.

The confounding section signal drive data HWLP (subscriber highway loop back) is data for instructing a slave-system loopback section 2301 shown in FIG. 23 provided to precede the selector 207 in the subscriber interface individual section 202 to loop back the control signals, the downward subscriber control clock DSCCK, and the downward subscriber control frame clock DSCFCK which are transferred from the slave-system subscriber interface common section 201 over the downward subscriber control highway DSCHW. This data is set to zero when the loopback is instructed; otherwise, it is set to one. Consequently, as shown in FIG. 23, the slave-system (#1 system in FIG. 23) loopback section 2301 loops the control signals, the downward subscriber control clock DSCCK and the downward subscriber control frame clock DSCFCK sent from the slave-system (#1 system in FIG. 23) subscriber interface common section 201 over the downward subscriber control highway DSCHW back to the subscriber interface common section as the control signals, the upward subscriber control clock USCCK and the upward subscriber control frame clock USCFCK on the upward subscriber control highway USCHW. When the loopback is not instructed, the upward subscriber control highway USCHW, the upward subscriber control clock USCCK and the upward subscriber control frame clock USCFCK sent from the control unit 208 to the master-system subscriber interface common section 201 are also sent to the slave-system subscriber interface common section 201 as they are as shown in FIG. 15.

Functions of Confounding Section SCN Bits

The confounding-section SCN bits (refer to (b) in FIG. 17) allocated to bit 16 to bit 23 (eight bits) in a frame on the upward subscriber control highway USCHW indicate scan data, or control signals by which the downward main signal monitor 209 and the downward control signal monitor 210 in the subscriber interface individual section 202 of FIG. 15 inform the subscriber interface common section 201 of a fault and the like.

Like the confounding-section SD bits, the confounding-section SCN bits have a multiframe configuration consisting of two frames. The confounding-section SCN bits Do to D7 in each of frame 0 and frame 1 in the multiframe configuration indicate confounding-section scan data in a corresponding one of row 0 and row 1 shown in FIG. 22.

Of the confounding-section scan data, data indicated in frame 0 (refer to (1) in FIG. 22) in the multiframe configuration are echoes of the confounding-section signal drive data indicated in frame 0 (row 0 in FIG. 21) in the multiframe configuration on the downward subscriber control highway DSCHW.

Of the confounding-section scan data indicated in frame 1 (row 1 in FIG. 22) in the multiframe configuration, data PEC (parity error of cell data) indicates a parity error fault of a main signal (subscriber cell) on the downward data highway DDHW. This data is set to zero when such a fault is indicated; otherwise, it is set to one. As shown as P1 and P5 in FIG. 15 or FIG. 24, the downward main signal monitor 209 in the subscriber interface individual section 202 monitors the state of a main signal on the downward data highway DDHW and sets the data PEC to zero upon detecting a parity error fault of that main signal.

The confounding section scan data CTC (cut of cell clock) indicates an interruption fault of the downward data clock DCK/DFEP. This data is set to zero when such a fault is indicated; otherwise, it is set to one. As shown as P2 and P4 in FIG. 15 or FIG. 24, the downward main signal monitor 209 in the subscriber interface individual section 202 monitors the state of the downward data clock DCK/DFEP and sets the data CTC to zero upon detecting a clock interruption fault.

The confounding section scan data PES (parity error of downward subscriber control highway stuck) indicates a stack fault of control signals on the downward subscriber control highway DSCHW. This data is set to zero when such a fault is indicated; otherwise, it is set to one. As shown as P3 and P7 in FIG. 15 or FIG. 24, the downward control signal monitor 210 in the subscriber interface individual section 202 monitors the alternating state of the PLT bit (refer to (a) in FIG. 17) on the downward subscriber control highway DSCHW and sets the data PES to zero when detecting that the PLT bit will not alternate with each frame to thereby recognize a stack fault of the downward subscriber control highway DSCHW.

The confounding section scan data CTS (cut of downward subscriber control clock) indicates a cut fault of the downward subscriber control clock DSCCK and the downward subscriber control frame clock DSCFCK. This data is set to zero when such a fault is indicated; otherwise, it is set to one. As shown as P4 and PS in FIG. 15 or FIG. 24, the downward control signal monitor 210 in the subscriber interface individual section 202 monitors the states of the downward subscriber control clock DSCCK and the downward subscriber control frame clock DSCFCK and sets the data to zero upon detecting a cut fault of these clocks.

By using the above-described PLT bit, spare bits, MFP bit, individual SD bit, individual SCN bits, confounding-section SD bits and confounding-section SCN bits shown at (a) and (b) in FIG. 17, a small number of specific control signals having real-time requirements can be communicated efficiently between the subscriber interface common section 201 and the subscriber interface individual section 202 as in the prior art.

<Other Bit Groups Having Real-Time Requirements>

The functions of other bit groups which are not directly related to the present invention but have real-time requirements will be described briefly.

Detection of Faults with Upward Main Signal/ Control Signals

As shown as P12 in FIG. 15 or FIG. 24, the main signal receiver 204 in the subscriber interface common section 201 monitors the state of a main signal on the upward data highway UDHW and, upon detecting a parity error fault with this main signal, sets a predetermined bit in an internal register not shown to zero.

As shown as P13 in FIG. 15 or FIG. 24, the main signal receiver 204 monitors the state of the upward data clock UCK/DFEP and, upon detecting a cut fault of the clock, sets a predetermined bit in the internal register not shown to zero.

As shown as P14 in FIG. 15 or FIG. 24, the control signal receiver 206 in the subscriber interface common section 201 monitors the alternating state of the PLT bit (FIG. 17(b)) on the upward subscriber control highway USCHW and, upon recognizing a stack fault on the upward subscriber control highway USCHW by detecting that the PLT bit will not alternate with each frame, sets a predetermined bit in the internal register to zero.

As shown as P15 in FIG. 15 or FIG. 24, the control signal receiver 206 monitors the state of the upward subscriber control clock USCCK and the upward subscriber control frame clock USCFCK. Upon detecting a cut fault of these clocks, the control signal receiver 206 sets a predetermined bit in the internal register not shown to zero. Also, upon detecting a fault that the upward subscriber control frame clock USCFCK gets out of sync, the control signal receiver 206 sets a predetermined bit in the internal register not shown to zero.

As described previously, the PLT bit allocated to the upward subscriber control highway USCHW is made zero in even-numbered frames and one in odd-numbered frames. As shown as P16 in FIG. 15 or FIG. 24, the control signal receiver 206 monitors a change in the PLT bit and, upon detecting that the even-numbered frames and the odd-numbered frames get out of sync, makes a predetermined bit in the internal register not shown to zero.

As described previously, the MFP bit allocated to the upward subscriber control highway USCHW is made one in the starting frame in the multiframe configuration and zero in the other frames. As shown as P17 in FIG. 15 or FIG. 24, the control signal receiver 206 monitors a change in the MFP bit allocated to the upward subscriber control highway USCHW and, upon detecting that the multiframes get out of sync, sets a predetermined bit in the internal register not shown to zero.

Protection of Signal Drive Data and Scan Data

For sure reception of control signals in the individual-section signal drive data (the individual SD in FIG. 17(a)) and the confounding-section signal drive data (the confounding-section SD in FIG. 17(a)), the subscriber interface individual section 202 of FIG. 15 performs a predetermined protection process on these control signals. Likewise, the subscriber interface common section 201 of FIG. 15 also performs a predetermined protection process on the control signals in the individual-section scan data (the individual SCN in FIG. 17(b)) and the confounding-section scan data (the confounding-section SCN in FIG. 17(b)).

Specifically, when the same value is received twice in succession for each control signal, the value is adopted as a correct value for it. Note that the protection process for each control signal varies depending on whether it is received every frame, every two frames, or every 16 frames. Hereinafter, the protection system performed by the subscriber interface individual section 202 or the subscriber interface common section 201 for each control signal will be described.

Figure 25:
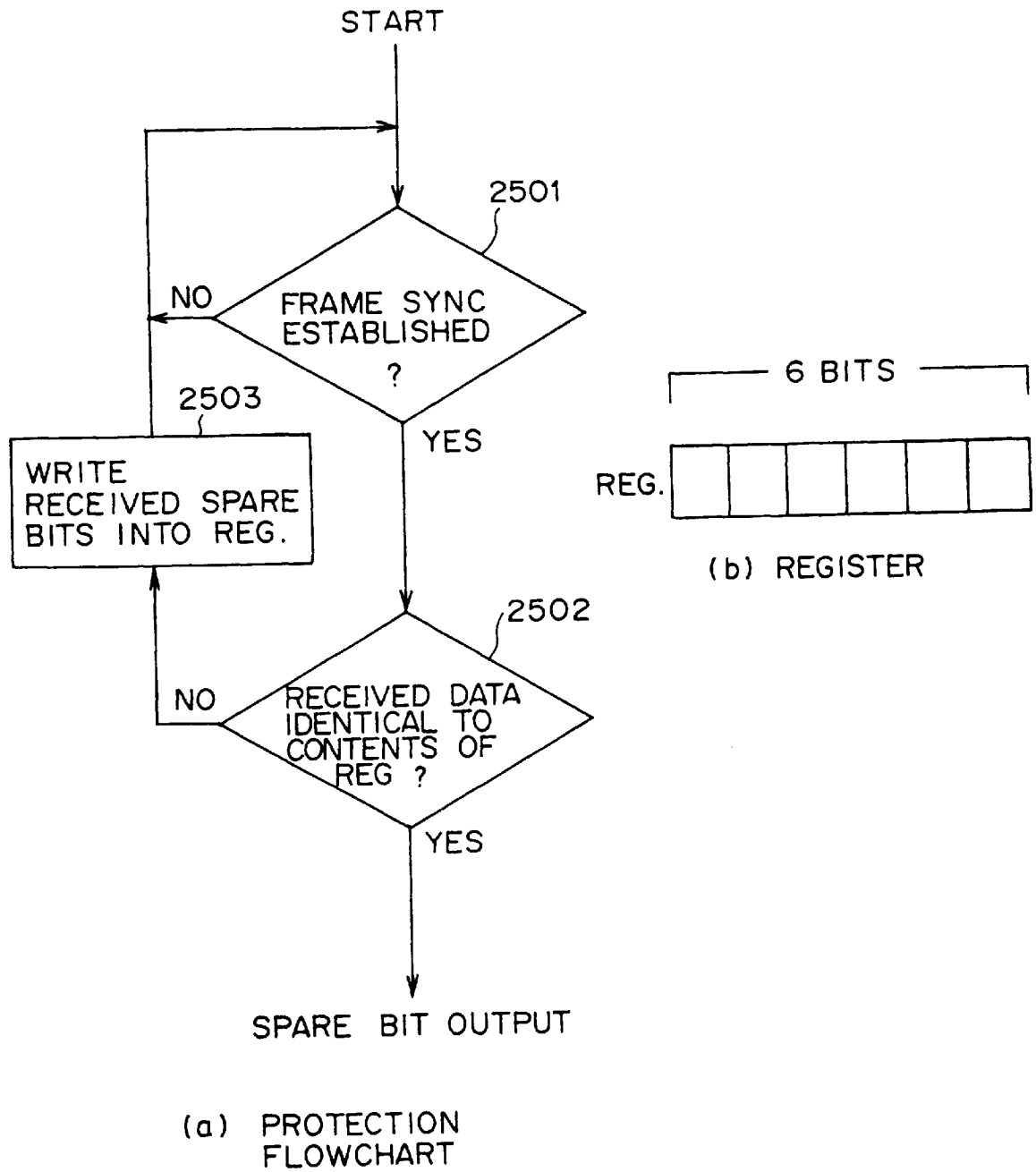
FIG. 25 is a diagram explaining a method of protecting spare bits in the second preferred embodiment.

First, FIG. 25 is an operating flowchart for the protection process performed on the spare bits. As described previously, the spare bits are transmitted every frame (refer to FIG. 18).

In step 2501, a decision is made as to whether or not the downward subscriber control frame clock DSCFCK or the upward subscriber control frame clock USCFCK is in sync. This decision is implemented by an operation of deciding whether the pulse timing (refer to (b) and (e) in FIG. 16) of each frame clock coincides with the receive timing of the PLT bit (refer to (a) and (b) in FIG. 17) on each highway.

If NO in step 2501, or in the case of lack of frame synchronization, then this step is repeated until the frame synchronization is established.

If, on the other hand, YES in step 2501, then step 2502 is performed. In this step, a decision is made as to whether each of the six spare bits in the currently received frame is identical to a corresponding respective bit in an internal 6-bit register (REG.) shown at (b) in FIG. 25. This register holds the spare bits received one frame before.

If YES in decision block 2502, i.e., if each of the currently received spare bits coincide with a corresponding one of the spare bits received one frame before, then each of the currently received spare bits is outputted as a correct value.

If, on the other hand, NO in decision block 2502, the spare bits in the currently received frame are written into the register REG. without being outputted. After that, the process for the next frame is carried out.

Figure 26:
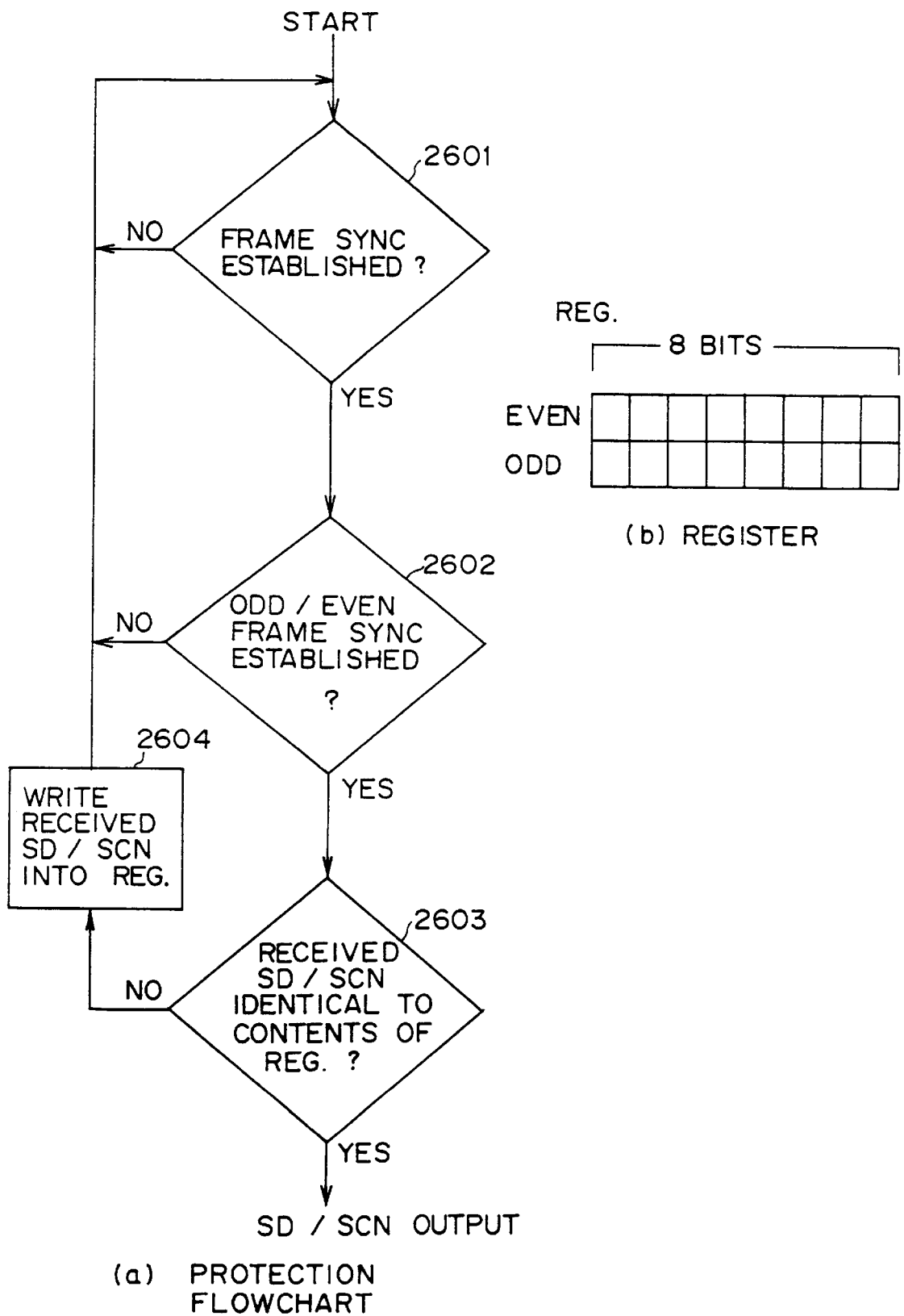
FIG. 26 is a diagram explaining a method of protecting confounding-section SD/SCN bits in the second preferred embodiment.

Next, FIG. 26 is an operating flowchart for the protection process performed on the confounding-section SD/SCN. As described previously, the confounding-section SD/SCN is transmitted in units of two frames (refer to FIGS. 21 and 22).

First, in step 2601, as with step 2501 of FIG. 25, a decision is made as to whether the downward subscriber control frame clock DSCFCK or the upward subscriber control frame clock USCFCK is in sync.

If the decision in step 2601 is NO, i.e., the decision is lack of frame synchronization, then this step is repeated until frame synchronization is established.

If YES in step 2601, then step 2602 is carried out. In this step, a decision is made as to whether the even-numbered frames and the odd-numbered frames are in sync. This decision is implemented as an operation of deciding whether the PLT bit alternates with each frame or not. As described previously, the PLT bit is made zero in even-numbered frames and one in odd-numbered frames.

If the decision is NO in step 2602, then the process returns to step 2601.

If the decision in step 2602 is YES, then step 2603 is carried out. In this step, a decision is made as to whether each of the eight confounding-section SD or SCN bits in the currently received frame coincides with a respective bit in one of 8-bit registers EVEN and ODD shown at (b) in FIG. 26 that corresponds to the value of the PLT bit in the currently received frame. The registers EVEN and ODD hold the confounding-section SD or SCN bits received two frames before and the confounding-section SD or SCN bits received one frame before, respectively.

If, therefore, YES in step 2603, or if each of the confounding-section SD or SCN bits in the currently received frame coincide with a corresponding one of the confounding-section SD or SCN bits received two or one frame before, then each of the currently received SD or SCN bits is outputted as a correct value.

If, on the other hand, the decision in step 2603 is NO, each of the SD or SCN bits in the currently received frame is written into the corresponding register EVEN or ODD in step 2604 without being outputted as a correct value. After that, the process for the next frame is carried out.

Finally, FIG. 27(*a*) is an operating flowchart for the protection process performed on the individual SD/SCN. As described previously, the individual SD/SCN are transmitted in units of 16 frames (refer to FIGS. 19 and 20).

First, in step 2701, as with step 2501 of FIG. 25, a decision is made as to whether the downward subscriber control frame clock DSCFCK or the upward subscriber control frame clock USCFCK is in sync.

If NO in step 2701, i.e., if the decision is lack of frame synchronization, this step is repeated until frame synchronization is established.

If, on the other hand, the decision in step 2701 is YES, then step 2702 is carried out. In this step, as with step 2602 of FIG. 26, a decision is made as to whether the even-numbered frames and the odd-numbered frames are in sync.

If the decision in step 2702 is NO, then the process returns to decision block 2701.

If YES in decision block 2702, then step 2703 is carried out. In this step, the individual SD or SCN bits in the currently received frame are written into one of frame-0 to frame-15 registers in a group REG. 1 of 8-bit registers shown at (b) in FIG. 27 that corresponds to the current frame number. The frame number is internally counted from 0 to 15.

Next, in step 2704, a decision is made as to whether the current frame number is 15, or the final frame in the multiframe configuration.

If the decision in step 2704 is NO, then the process returns to decision block 2701.

If the decision in step 2704 is YES, then step 2705 is carried out. In this step, a decision is made as to whether multiframe synchronization is established. This decision is implemented as a process of deciding whether the time that the MFP bit on the downward subscriber control highway DSCHW or the upward subscriber control highway USCHW goes to one coincides with the time that the frame number becomes zero. As described previously, the MFP bit is made one in the starting frame in the multiframe configuration and zero in the other frames.

If the decision in step 2705 is NO, then the process returns to decision block 2701.

If the decision in step 2705 is YES, step 2706 is carried out. In this step, a decision is made as to whether each of the individual SD or SCN bits for the most recent multiframe received by the frame-0 to frame-15 registers in the register group REG. 1 is identical to a corresponding bit in frame-0 to frame-15 registers, each of eight bit, in a register group REG. 2 shown at (c) in FIG. 27. The register group REG. 2 holds the individual SD or SCN bits received one multiframe before.

If the decision in step 2706 is YES, i.e., when each of the individual SD or SCN bits received in the current multiframe coincides with a corresponding one of the individual SD or SCN bits received one multiframe before, each of the SD or SCN bits is outputted as a correct value.

If, on the other hand, the decision in step 2706 is NO, each of the individual SD or SCN bits in the current multiframe entered into the register group REG. 1 is not outputted as a correct value but moved into the register group REG. 2 in step 2707. Then, the process for the next frame is carried out.

<Functions of Bits for DMA Transfer>

Next, the functions of bits implementing DMA transfer which are related to the features of the present invention will be described.

Data Format

As shown in FIG. 17, in the second preferred embodiment, the DMA control bit group and the DMA DATA bit group are allocated on a time-division basis to the subscriber control highways in addition to the SD/SCN bit group. The use of these bit groups allows a large number of control signals, such as subscriber traffic information and the like, which may occur irregularly to be transferred.

Figure 28:
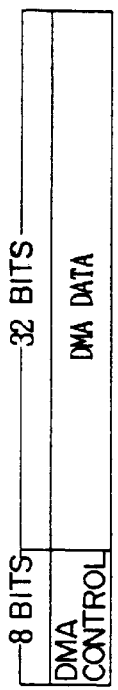
FIG. 28 is a diagram showing data formats of bits that implement DMA transfer in the second preferred embodiment.

As shown at (a) in FIG. 28, the DMA control bit group comprises eight bits that contain control signals for controlling DMA transfer. The DMA DATA bit group comprises 32 bits which contain data to be DMA transferred.

FIG. 28 shows at (b) data formats of the DMA control bit group. In this figure, (b-1) shows the data format of the DMA control bit group (refer to (b) in FIG. 17) on the upward subscriber control highway USCHW, while (b-2) shows the data format of the DMA control bit group (refer to (a) in FIG. 17) on the downward subscriber control highway DSCHW. The meaning of each bit will be described later.

FIG. 28 shows at (c) the data format of the DMA DATA bit group. One word is composed of 32 bits transferred in one frame. The word length of word data is set at the start of DMA transfer and the word data is transferred in a plurality of frames corresponding to the word length. An error checking CRC word is transferred in the last frame. For this reason, the multiframe configuration of two frames or 16 frames is not used in the DMA transfer.

Figure 29:
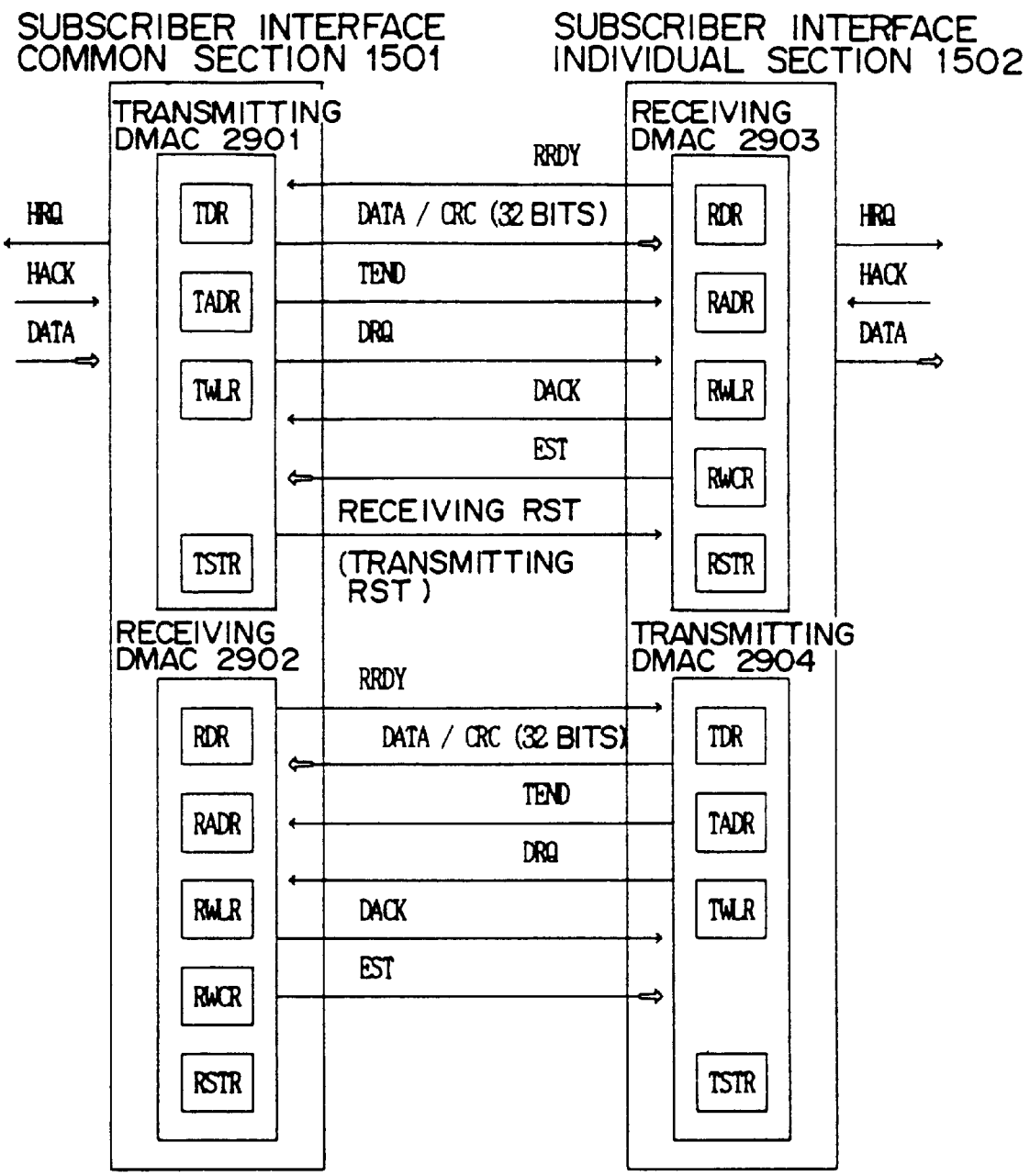
FIG. 29 is a diagram showing a functional configuration of DMA transfer in the second preferred embodiment.

Next, FIG. 29 is a diagram for use in explanation of the DMA transfer function of the second preferred embodiment of FIG. 15.

In the figure, a transmitting DMAC 2901 is a transmitting DMA controller installed in the control signal transmitter 205 of the subscriber interface common section 201 shown in FIG. 15, while a receiving DMAC 2902 is a receiving DMA controller installed in the control signal receiver 206 of the subscriber interface common section 201. A receiving DMAC 2903 is a receiving DMA controller installed in the control unit 208 of the subscriber interface individual section 202, while a transmitting DMAC 2904 is a transmitting DMA controller which is also installed in the control unit 208.

In the transmitting DMAC 2901 or 2904 of FIG. 29, a register TDR (transmission data register) stores transmission data. A register TADR (transmission address register) stores a transmission address. A register TWLR (transmission word length register) stores a transmission word length. A register TSTR (transmission status register) stores a transmission status.

In the receiving DMAC 2902 or 2903 of FIG. 29, a register RDR (receive data register) stores receive data. A register RADR (receive address register) stores a receive address. A register RWLR (receive word length register) stores a receive word length. A register RWCR (receive word count register) stores the count of received words. A register RSTR (receive status register) stores a receive status.

Next, signals that are communicated between the transmitting DMAC 2901 or 2904 and the receiving DMAC 2902 or 2903 using data formats shown in FIG. 28 will be described.

A receive buffer ready signal PRDY (receive ready), which is presented from the receiving DMAC to the transmitting DMAC, indicates that the receiving DMAC is ready to receive.

Transmit data DMA DATA is data, such as subscriber traffic information or the like, that is DMA transferred from the transmitting DMAC 2901 or 2904 to the receiving DMAC 2902 or 2903 in the data format shown at (c) in FIG. 28.

Data CRC is one-word data for error checking which is transferred last to follow the transmit data DMA DATA as shown at (c) in FIG. 28.

A transmission data end signal TEND (transmission end), which is transmitted from the transmitting DMAC 2901 or 2904 to the receiving DMAC 2902 or 2903, indicates the end of DMA transmission.

A DMA request signal DRQ (DMA request) is used for the transmitting DMAC 2901 or 2904 to make a request to the receiving DMAC 2902 or 2903 for the start of DMA transmission.

A DMA acknowledge signal DACK (DMA acknowledgment) is a signal used for the receiving DMAC 2902 or 2903 to present an acknowledgment to the transmitting DMAC 2901 or 2904.

A data end status signal EST (end status) is used for the receiving DMAC to inform the transmitting DMAC of the end status of DMA transmission and consists of two bits of EST 0 bit and EST 1 bit shown at (b) in FIG. 28.

Though not shown in FIG. 29, a receive reset signal RST and a transmission reset signal RST shown at (b-2) in FIG. 28 are used for the transmitting DMAC 2901 or 2904 to reset the receiving DMAC 2902 or 2903 in case where DMA transmission is terminated abnormally due to some cause.

Next, signals communicated between the transmitting DMAC (2901 or 2904) or the receiving DMAC (2902 or 2903) and a microprocessor (not shown) in the subscriber interface common section 201 or the subscriber interface individual section 202 will be described.

A bus acquisition request signal HRQ (halt request) is used for the transmitting DMAC 2901 or 2904 or the receiving DMAC 2902 or 2903 to request the microprocessor to halt the microprocessor and acquire a bus.

A bus release notification signal HACK (halt acknowledge) is used for the microprocessor to notify the transmitting DMAC 2901 or 2904 or the receiving DMAC 2902 or 2903 of halt of the microprocessor and release of the bus.

Transmit data DATA is data, such as subscriber traffic information and the like, that is transferred in units of 32 bits from a RAM in the microprocessor to a register TDR in the transmitting DMAC 2901 or 2904 or from a register PDR in the receiving DMAC 2902 or 2903 to a RAM in the microprocessor.

DMA Transmission Sequence

A description will be given of a specific DMA transfer sequence based on the above-described data formats.

Figure 30:
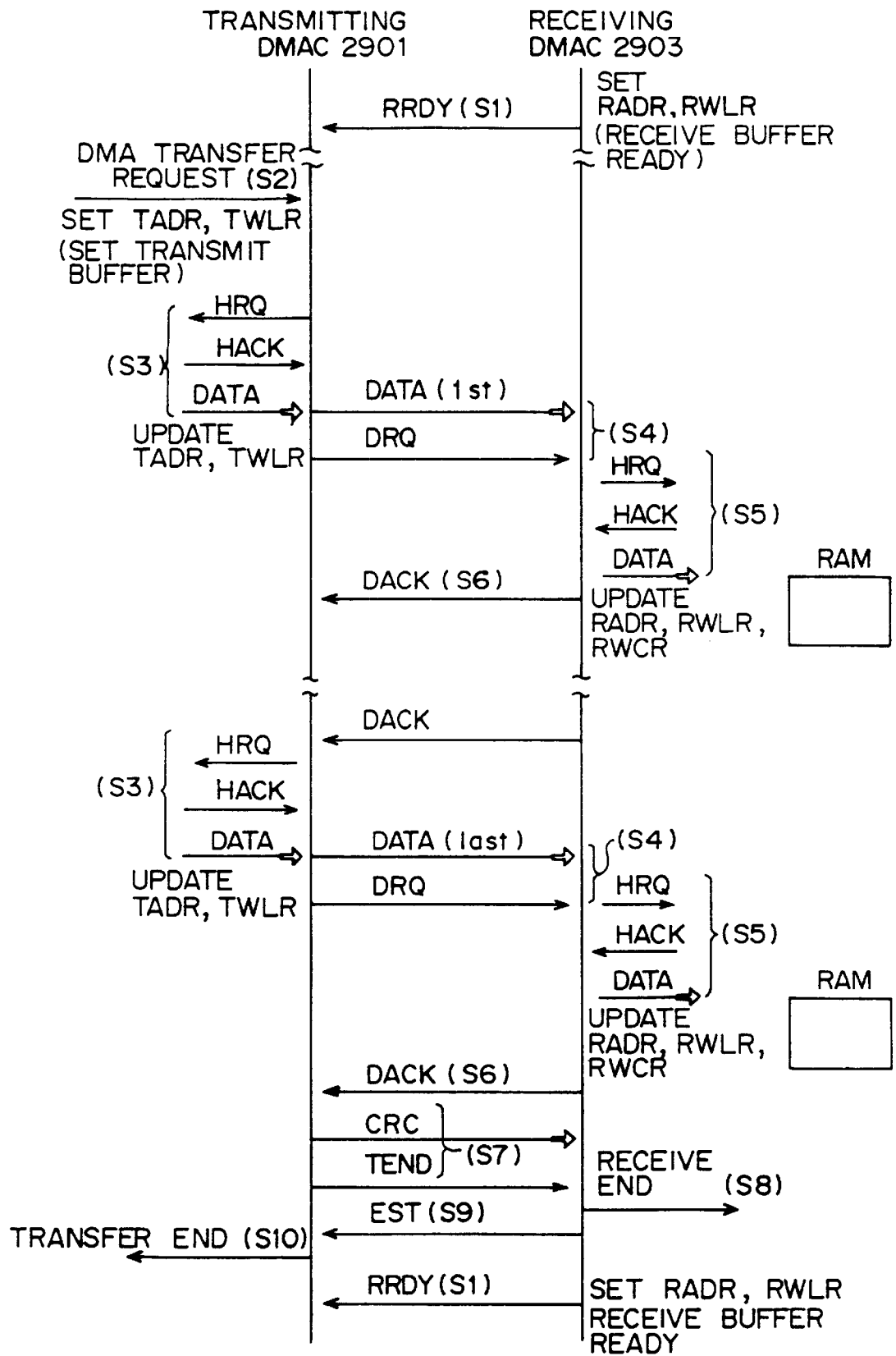
FIG. 30 shows a DMA transfer sequence from the subscriber interface common section 1501 to the subscriber interface individual section 1502 in the second preferred embodiment.

FIG. 30 is a diagram showing a DMA transmission sequence from the subscriber interface common section 201 to the subscriber interface individual section 202. This DMA transmission is controlled by the transmitting DMAC 2901 in the subscriber interface common section 201 and the receiving DMAC 2903 in the subscriber interface individual section 202.

First, at the time no DMA transmission is being made, the receiving DMAC 2903 in the subscriber interface individual section 202 places the address of a receiving buffer area in a receiving RAM (not shown) into the register RADR, places a receive word length into the register RWLR, places a receive buffer ready signal PRDY indicating that the receiving buffer is ready to receive into the DMA control bit group (refer to (b) in FIG. 17) on the upward subscriber control highway USCHW, thereby signaling the transmitting DMAC 2901 in the subscriber interface common section 201 to make DMA transmission (sequence S1).

Then, the microprocessor in the subscriber interface common section 201 presents a DMA transmission request to the transmitting DMAC 2901. Upon receipt of the DMA transmission request after the receipt of the receive buffer ready signal RRDY, the transmitting DMAC 2901 places the address of a transmission buffer area in the transmitting RAM into the register TADR and a transmission word length into the register TWLR (sequence S2).

Next, the transmitting DMAC 2901 provides a bus acquisition request signal HRQ for microprocessor halt and bus acquisition to the DMA transmission requesting microprocessor in the subscriber interface common section 201. In response to this, the microprocessor returns a bus release notification signal HACK to the transmitting DMAC 2901 and then sends data DATA of a first word (32 bits) from the RAM address area indicated by the register TADR to the register TDR in the transmitting DMAC 2901. After that, the contents of the registers TADR and TWLR in the transmitting DMAC 2901 are updated (sequence 3).

Next, the transmitting DMAC 2901 places the first-word data DATA placed into the register TDR and a DMA request signal DRQ into the DMA DATA bit group and the DMA control bit group (see (a) in FIG. 17), respectively, on the downward subscriber control highway DSCHW (sequence S4).

The receiving DMAC 2903 in the subscriber interface individual section 202 receives into its internal register RDR the DMA DATA bit group in a frame in which the DMA request signal DRQ has been placed into the DMA control bit group on the downward subscriber control highway DSCHW.

Upon receipt of the data DMA DATA into the register RDR, the receiving DMAC 2903 provides a bus acquisition request signal HRQ for microprocessor halt and bus acquisition to the microprocessor in the subscriber interface individual section 202. In response to this, the microprocessor returns a bus release notification signal HACK to the receiving DMAC 2903. Then, the first-word data DATA is transferred from the register RDR in the receiving DMAC 2903 to the RAM address area indicated by the register RADR. After that, the contents of the registers RADR, RWLR and RWCR in the receiving DMAC 2903 are updated (sequence S5).

On termination of transfer of the data DATA to the RAM, the receiving DMAC 2903 places a DMA acknowledge signal DACK into the DMA control bit group on the upward subscriber control highway USCHW, thereby notifying the transmitting DMAC 2901 in the subscriber interface common section 201 of the normal termination of transfer of the first-word data DMA DATA (sequence S6).

After that, the above-described operations S3 to S5 are repeated, so that data DMA DATA corresponding to the number of words (see (c) in FIG. 28) specified in the register TWLR in the transmitting DMAC 2901 and the register RWLR in the receiving DMAC 2903 is transferred from the RAM in the subscriber interface common section 201 to the RAM in the subscriber interface individual section 202.

After the transfer of the last word, the transmitting DMAC 2901 transmits CRC data for one word and a data transmission end signal TEND through the DMA DATA bit group and the DMA control bit group on the downward subscriber control highway DSCHW to the receiving DMAC 2903 in the subscriber interface individual section 202 (sequence S7).

The receiving DMAC 2903 performs a CRC check on the received data DMA DATA for the specified number of words on the basis of the received CRC data and then notifies the microprocessor not shown in the subscriber interface individual section 202 of the end of reception when the data DMA DATA is validated (sequence S8).

Then, the receiving DMAC 2903 transmits a data end status signal EST indicating the end status of the DMA transmission and corresponding to the contents of the register RSTR to the transmitting DMAC 2901 in the subscriber interface common section 201 through the bits EST 0 and EST 1 (see (b-1) in FIG. 28) in the DMA control bit group on the upward subscriber control highway USCHW (sequence S9).

The transmitting DMAC 2901 notifies the microprocessor not shown in the subscriber interface common section 201 of the end of transmission if the received data end status signal EST is normal (sequence S10).

After that, the receiving DMAC 2903 in the subscriber interface individual section 202 places the address of another receiving buffer area in the receiving RAM (not shown) into the register RADR, places a receive word length into the register RWLR, places a receive buffer ready signal RRDY indicating that the receiving buffer is ready to receive into the DMA control bit group (refer to (b) in FIG. 17) on the upward subscriber control highway USCHW, thereby signaling the transmitting DMAC 2901 in the subscriber interface common section 201 to make DMA transmission (sequence S1). As a result, the next DMA transmission is made possible.

Figure 31:
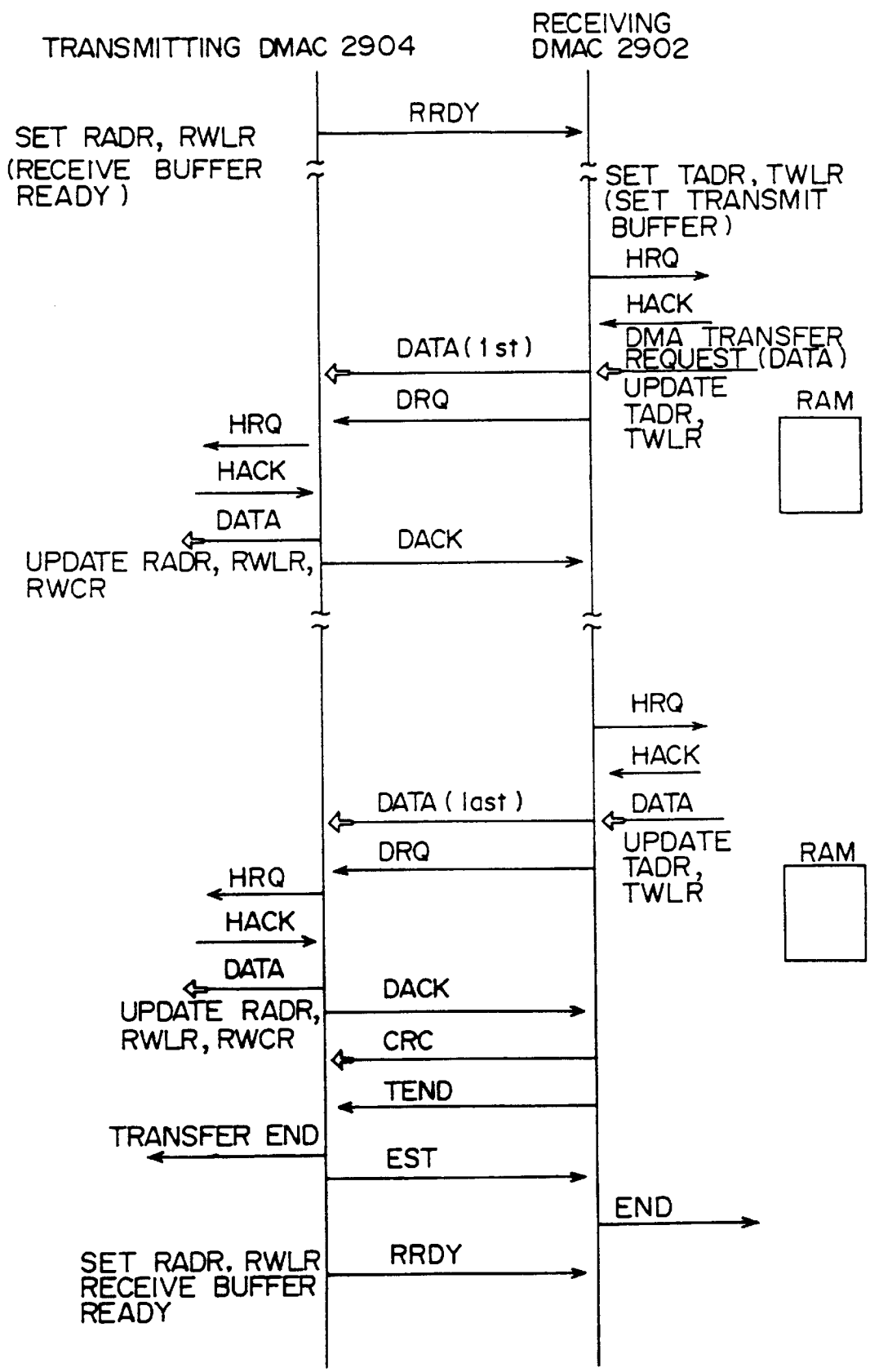
FIG. 31 shows a DMA transfer sequence from the subscriber interface individual section 1502 to the subscriber interface common section 1501 in the second preferred embodiment.

FIG. 31 shows a DMA transmission sequence from the subscriber interface individual section 202 to the subscriber interface common section 201. This DMA transmission is controlled by the transmitting DMAC 2904 in the subscriber interface individual section 202 and the receiving DMAC 2902 in the subscriber interface common section 201. As is evident from a comparison with the sequence of FIG. 30, this sequence is implemented by the transmitting DMAC 2904 and the receiving DMAC 2902 performing exactly the same control operations as the transmitting DMAC 2901 and the receiving DMAC 2903.

As described above, according to the second preferred embodiment, the SD/SCN bits on the subscriber control highway allow a small number of specific control signals having real-time requirements for device resetting, fault notification and the like to be communicated efficiently between the subscriber interface common section 201 and the subscriber interface individual section 202 as in the prior art and moreover the DMA control bit group and the DMA DATA bit group on the subscriber control highway allow a large number of control signals, such as subscriber traffic information and the like, which may occur irregularly to be transferred, which constitutes a great feature of the present invention.

<Other Modifications of the Second Preferred Embodiment>

In the second embodiment, the present invention is applied to control signal communications between the #0- and #1-system subscriber interface common sections 201 and the subscriber interface individual section 202, which are internal duplex devices of an ATM exchange. This is not restrictive. Of course, it is also possible to apply the present invention to control signal communications between subscriber interface common sections in an ATM exchange and a central control unit.

In this case, as with the first preferred embodiment, it is also possible to connect a subscriber interface common section and an ATM switch by a terminal interface cable which integrally incorporates a main signal (subscriber cell) transmission line ad a control signal transmission line.

What is claimed is:

1. An in-station control system for controlling control data communications between a peripheral device in an exchange station that receives subscriber information in synchronism with a highway clock and makes information exchange and a control unit in said exchange station, comprising:

a peripheral device cable connected to said peripheral device and integrally incorporating a subscriber link that is a physical line for transmitting said subscriber information in synchronism with said highway clock and a control link that is a physical line for transmitting said control data in synchronism with said highway clock and a control data conversion unit controlling interfacing between control data transferred over said control link in synchronism with said highway clock; and control data that said control unit transmits/receives asynchronously with said highway clock;

wherein said control link includes a hard link that is a physical line for repeatedly transferring the state of a first control data group of said control data at regular intervals and in synchronism with said highway clock.

2. The system according to claim 1, wherein said subscriber information is transferred over said subscriber link on a cell-by-cell basis, each cell having a predetermined data length, and wherein the transfer of said first control data group and the transfer of cells are synchronized.

3. The system according to claim 1, wherein said control data conversion unit comprises:

a first buffer memory for receiving the state of said first control data group transferred over said hard link in synchronism with said highway clock and overwriting each state of control data in said first control data group into a storage location corresponding to each state;

a receiver circuit for reading the storage contents of said first buffer memory in synchronism with a control clock controlled by said control unit and transferring said storage contents to said control unit;

a second buffer memory for overwriting each state of control data in said first control data group sent from said control unit into the storage location corresponding to each state in synchronism with said control clock; and a transmitter circuit for transmitting the storage contents of said second buffer memory over said hard link at said regular intervals and in synchronism with said highway clock.

4. The system according to claim 3, wherein said subscriber information is transferred over said subscriber link on a cell-by-cell basis, each cell having a predetermined data length, and wherein the transfer of said first control data group and the transfer of cells are synchronized.

5. The system according to claim 1, wherein said control link further comprises:

a direct memory access link that is a physical line for transferring a second control data group of said control data in accordance with a direct memory access transfer procedure and in synchronism with said highway clock; and a direct memory access enable link that is a physical line for transferring, in synchronism with said highway clock, a direct memory access enable signal specifying the effective duration of data on said direct memory access link; and wherein said first control data group transferred over said hard link comprises a direct memory access control data group for controlling the direct memory access transfer of said second control data group over said direct memory access link.

6. The system according to claim 5, wherein said subscriber information is transferred over said subscriber link on a cell-by-cell basis, each cell having a predetermined data length, and wherein the transfer of said first control data group and the transfer of cells are synchronized.

7. The system according to claim 5, wherein said control data conversion unit comprises:

a first buffer memory for receiving the state of said first control data group transferred over said hard link in synchronism with said highway clock and overwriting each state of control data in said first control data group into a storage location corresponding to each state;

a receiver circuit for reading the storage contents of said first buffer memory in synchronism with a control clock controlled by said control unit and transferring said to said control unit;

a second buffer memory for overwriting each state of control data in said first control data group sent from said control unit into the storage location corresponding to each state in synchronism with said control clock; and a transmitter circuit for transmitting the storage contents of said second buffer memory over said hard link at said regular intervals and in synchronism with said highway clock.

8. A control data conversion unit for use with an in-station control system for controlling control data communications between a peripheral device in an exchange station which receives subscriber information in synchronism with a highway clock and makes subscriber information exchange and a control unit in said exchange station, wherein said control data conversion unit controls interfacing between control data transferred synchronously with said highway clock over a control link that is included in a peripheral device cable which is connected to said peripheral device and integrally incorporates a subscriber link that is a physical line for transmitting said subscriber information in synchronism with said highway clock and said control link for transmitting said control data in synchronism with said highway clock and control data that said control unit transmits/receives asynchronously with said highway clock;

wherein said control link includes a hard link that is a physical line for repeatedly transferring the state of a first control data group of said control data at regular intervals and in synchronism with said highway clock.

9. An in-station control method of controlling control data communications between a peripheral device in an exchange station which receives subscriber information in synchronism with a highway clock and makes information exchange and a control unit in said exchange station, comprising;

connecting to said peripheral device a peripheral device cable which integrally incorporates a subscriber link that is a physical line for transmitting said subscriber information in synchronism with said highway clock and a control link that is a physical line for transmitting data in synchronism with said highway clock; and controlling interfacing between control data transferred over said control link in synchronism with said highway clock and control data that said control unit transmits/receives asynchronously with said highway clock;

wherein said control link includes a hard link that is a physical line for repeatedly transferring the state of a first control data group of said control data at regular intervals and in synchronism with said highway clock.

10. An in-device control method of controlling data transfer between first and second devices comprising the steps of:

dividing a data transfer time interval on a signal line installed between said first and second devices into a first data transfer subinterval allotted for direct memory access transfer and a second data transfer subinterval;

performing direct memory access transfer processing in said first data transfer subinterval; and performing data transfer processing other than said direct memory transfer processing between said first and second devices in said second data transfer subinterval.

11. An in-device control system for controlling data transfer between first and second devices connected by a signal line unit comprising:

a direct memory access control unit provided in each of said first and second devices for performing direct memory access transfer processing between said first and second devices in a first data transfer time interval allocated to said signal line unit installed between said first and second devices for direct memory access transfer; and a data transfer control unit provided in each of said first and second devices for performing data transfer processing other than said direct memory transfer between said first and second devices in a second data transfer time interval allocated to said signal line unit, wherein:
said signal line unit comprises a first signal line corresponding to the direction from said first device to said second device and a second signal line corresponding to the direction from said second device to said first device; and
said direct memory access control unit and said data transfer control unit control direct memory access transfer processing and data transfer processing other than said direct memory access processing using said first signal line and direct memory access transfer processing and data transfer processing other than said direct memory access processing using said second signal line in synchronization with a first clock and a second clock, respectively.

12. An in-device control system for controlling data transfer between first and second devices connected a by signal line unit comprising:

a direct memory access control unit provided in each of by first and second devices for performing direct memory access transfer processing between said first and second devices in a first data transfer time interval allocated to said signal line unit installed between said first and second devices for direct memory access transfer; and a data transfer control unit provided in each of said first and second devices for performing data transfer processing other than said direct memory transfer between said first and second devices in a second data transfer time interval allocated to said signal line unit;

wherein:
said second data transfer time interval is divided into a plurality of data transfer subintervals; and
said data transfer control unit controls each of independent data transfer processes in a respective one of said data transfer subintervals.

13. The in-device control system according to claim 12, wherein said data transfer control unit performs an independent data protection process for each of said data processes performed in said data transfer subintervals.

14. An in-station control system for controlling control data communications between a peripheral device in an exchange station that receives subscriber information in synchronism with a highway clock and makes information exchange and a control unit in said exchange station, comprising;

a peripheral device cable connected to said peripheral device and integrally incorporating a subscriber link that is a physical line for transmitting said subscriber information in synchronism with said highway clock and a control link that is a physical line for transmitting said control data in synchronism with said highway clock; and control data conversion means for controlling interfacing between control data transferred over said control link in synchronism with said highway clock and control data that said control unit transmits/receives asynchronously with said highway clock;

wherein said control link includes a hard link that is a physical line for repeatedly transferring the state of a first control data group of said control data at regular intervals and in synchronism with said highway clock.

15. An in-device control system for controlling data transfer between first and second devices connected by signal line means comprising:

direct memory access control means provided in each of said first and second devices for performing direct memory access transfer processing between said first and second devices in a first data transfer time interval allocated to said signal line means installed between said first and second devices for direct memory access transfer; and data transfer control means provided in each of said first and second devices for performing data transfer processing other than said direct memory transfer between said first and second devices in a second data transfer time interval allocated to said signal line means, wherein:
said signal line means comprises a first signal line corresponding to the direction from said first device to said second device and a second signal line corresponding to the direction from said second device to said first device; and
said direct memory access control unit and said data transfer control unit control direct memory access transfer processing and data transfer processing other than said direct memory access processing using said first signal line and direct memory access transfer processing and data transfer processing other than said direct memory access processing using said second signal line in synchronization with a first clock and a second clock, respectively.

* * * * *